United States Patent [19]
Saitou et al.

[11] Patent Number: 5,058,014
[45] Date of Patent: Oct. 15, 1991

[54] ELECTRONICALLY CONTROLLED AUTOMATIC TRANSMISSION

[75] Inventors: Yoshitami Saitou; Nobuyuki Isono; Nobuyasu Suzumura, all of Aichi, Japan

[73] Assignee: Aisin Seiki K.K., Aichi, Japan

[21] Appl. No.: 415,733

[22] Filed: Oct. 2, 1989

[30] Foreign Application Priority Data

Sep. 30, 1988 [JP] Japan .................. 63-248364

[51] Int. Cl.$^5$ ............................................. B60K 41/18
[52] U.S. Cl. ................................. 364/424.1; 74/866
[58] Field of Search .............. 364/424.1; 74/861, 866, 74/867, 868, 869; 192/0.044, 0.075, 76

[56] References Cited

U.S. PATENT DOCUMENTS

| | | | |
|---|---|---|---|
| 4,791,568 | 12/1988 | Hiramatsu et al. | 364/424.1 |
| 4,831,900 | 5/1989 | Yamamoto et al. | 74/869 |
| 4,894,780 | 1/1990 | Simonyi et al. | 364/424.1 |
| 4,905,786 | 3/1990 | Miyake et al. | 364/424.1 |
| 4,913,004 | 4/1990 | Panoushek et al. | 74/861 |
| 4,928,235 | 5/1990 | Metha et al. | 364/424.1 |

*Primary Examiner*—Salvatore Cangialosi
*Attorney, Agent, or Firm*—Sughrue, Mion, Zinn Macpeak & Seas

[57] ABSTRACT

An electronically controlled automatic transmission including an automatic gear shift for changing the gear ratio according to the coupling/decoupling of the brake and clutch, a hydraulic switch for controlling a hydraulic pressure exerted on the brake and clutch, a timer for setting a time of coupling/decoupling of the clutch and brake during a shifting period, a detector for detecting vehicle information, a time correcting device for correcting the set time according to the detected vehicle information, and an electronic control device for driving the hydraulic switch and for changing the state of coupling/decoupling. The electronic control device having a temperature detector for detecting the temperature of the working fluid of the hydraulic switch, and a feedback stop device for stopping the correction by the time correcting device when the temperature detector detects that the temperature of the working fluid is below a predetermined temperature.

5 Claims, 14 Drawing Sheets

ELECTRONICALLY CONTROLLED AUTOMATIC TRANSMISSION

FIELD OF THE INVENTION

The invention relates to an electronically controlled automatic transmission of a vehicle.

BACKGROUND OF THE INVENTION

In a known vehicle automatic transmission, a coupled clutch or brake is released when vehicle changes speed, and then is coupled with another clutch or brake in order to provide the next shift range. Shock will occur in this case because of the time lag between the time the clutch or brake is released and the time the clutch or brake is again coupled.

In order to reduce the shock which occurs during a shifting period, engine information, such as the shift up speed, the engine duty, the timing of the clutch or brake coupling and releasing, the coupling speed, etc, are measured, and then fed back and controlled, so that the shock can be reduced. However, the operation of the automatic gear shift will be influenced by the change of movement of the hydraulic switching means (e.g., hydraulic circuit) as the temperature of the working fluid changes. For example, when oil is employed as a working fluid, its viscosity will become high at a low temperature which results in a poor response. For this reason, a time lag occurs between the time the clutch or brake is released, at a releasing side, and the time the clutch or brake is coupled, at coupling side, causing a large shock.

SUMMARY OF THE INVENTION

Accordingly, an object of the present invention is to avoid very large shock during a shift, even when the ambient temperature changes.

In order to solve the aforementioned problem, the technical means used in the present invention is an electronically controlled automatic transmission which comprises an automatic gear shift having a clutch and a brake which are driven by hydraulic pressure and the gear ratio is changed in accordance with the coupling and decoupling of the clutch and the brake, a hydraulic switching means for controlling the hydraulic pressure exerted on said clutch and said brake, timing or rate setting means for setting a time or rate of coupling or releasing of the clutch and the brake during a shifting period, a vehicle information detecting means for detecting vehicle information during the shifting period, a correction means for correcting a set time or rate of coupling or releasing according to the vehicle information, and an electronic control means for driving the hydraulic pressure switching means in accordance with said set time or rate and for changing the state of coupling and decoupling of the clutch and brake. The electronically controlled automatic transmission further comprising a temperature detecting means for detecting the temperature of the working fluid of the hydraulic pressure switching means, and a feedback stop means for stopping the correction of timing or rate by the timing or rate correction means when the detected temperature of the temperature detecting means, indicates that the working fluid is below a predetermined temperature.

In normal shifting, an optimal gear shifting operation with the least amount of shock can be conducted by means of the correction means. Here, when the temperature of the working fluid drops, a low temperature state of working fluid will be detected by the temperature detecting means, and the correction of timing or rate by the correction means will be stopped by means of the feedback stop means.

DETAILED DESCRIPTION OF EMBODIMENT

An embodiment using the present invention will now be described with reference to the drawings. In the embodiment, the automatic transmission employs four shift ranges (with over drive) which are generally used.

Figure 1:
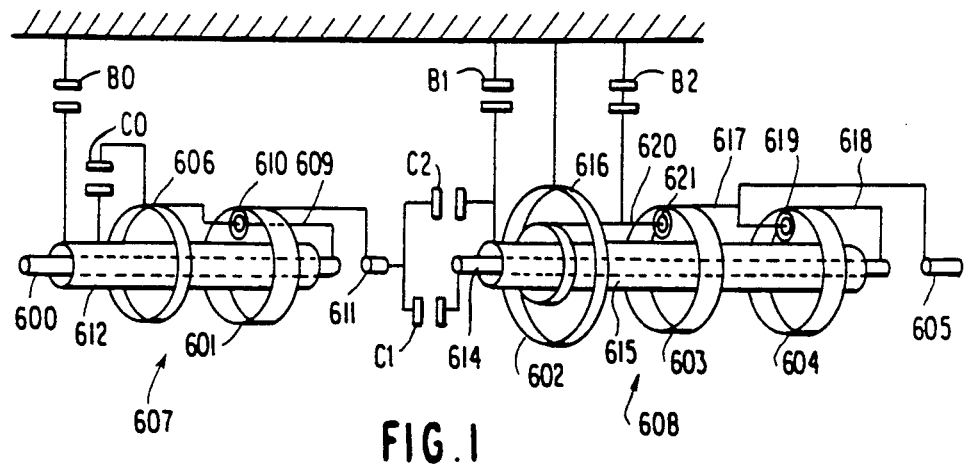
FIG. 1 shows the automatic gearshift of the electronically controlled automatic transmission as an embodiment of the invention.

The movements of the automatic transmission will now be described according to FIG. 1. A turbine shaft 600 used an input shaft of an over drive mechanism 607 is connected with the engine through a torque converter. The engine shaft 600 is connected with a carrier 609 of a planetary gear train. A planetary pinion 610 which is rotationally supported through the carrier 609 is connected with an input shaft 611 of a gear shifting mechanism 603 through an over drive planetary gear 601, and the planetary pinion 610 is engaged with a sun gear 612. A one-way clutch 606 and an over drive clutch C0 are disposed between the sun gear 612 and the carrier 609. An over drive brake B0 is disposed between the sun gear 612 and a housing 613. A forward clutch C1 is disposed between the input shaft 611 of a gear shifting mechanism 608 and an intermediate shaft 614, and a direct clutch C2 is disposed between the input shaft 611 and a sun gear shaft 615. A second brake B1 is disposed between the sun gear shaft 615 and a housing 613. A planetary pinion 619, which is rotationally supported by a carrier 617 connected with an output shaft 605, is connected with the intermediate shaft 614 through a gear and its carrier 618. The planetary pinion 619 is engaged with the sun gear shaft 615. A planetary pinion 621 is engaged with the carrier 617 and the sun gear shaft 615. A first and reverse brake B2 is disposed between the planetary pinion 621 and the housing 613. Furthermore, a one-way clutch 616 is disposed between the planetary gear 621 and the housing 613.

In this automatic transmission, the relationship between the clutches C0, C1, C2, the brakes B0, B1, B2 and the shift ranges is shown in the following list.

List 1

| | State of Clutch or Brake | | | | | |
|---|---|---|---|---|---|---|
| | C0 | C1 | C2 | B0 | B1 | B2 |
| R | O | X | O | X | X | X |
| P,N | O | X | X | X | X | X |
| O/D | X | O | O | O | X | X |
| 3rd | O | O | O | X | X | X |
| 2nd | O | O | X | X | O | X |
| 1st | O | O | X | X | X | O |

O: coupling  X: decoupling

Figure 2:
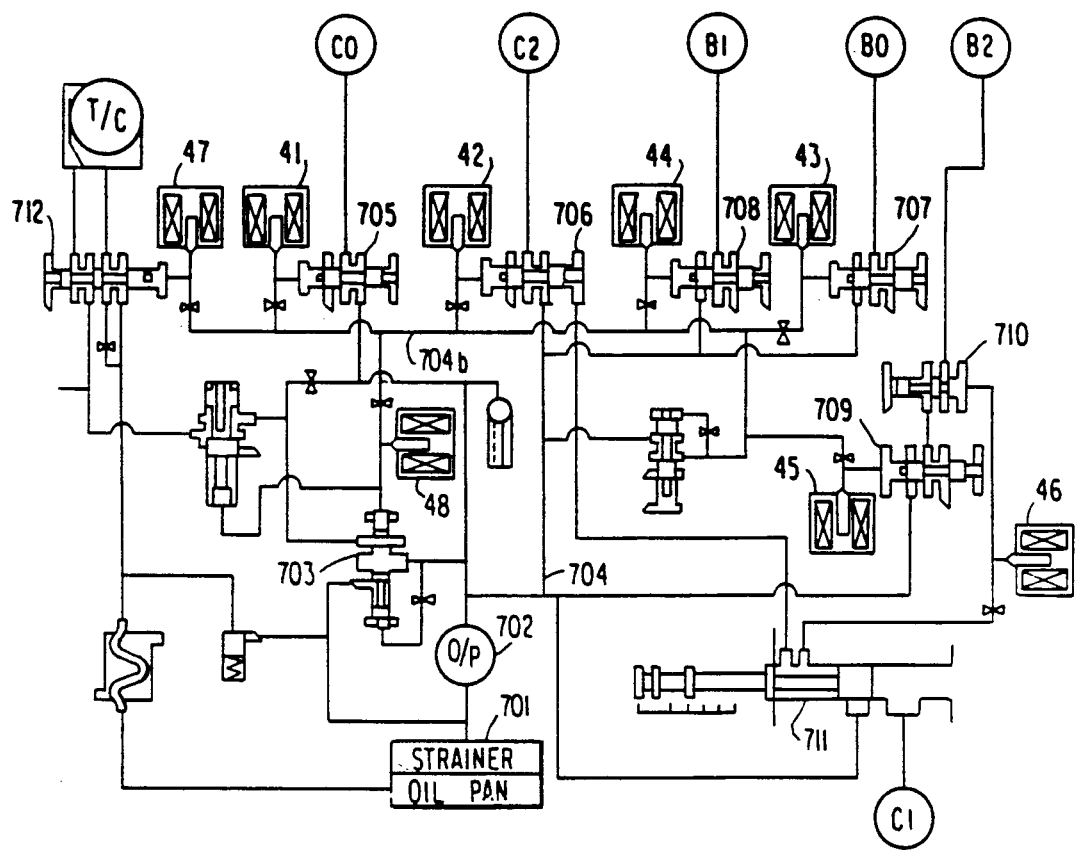
FIG. 2 shows the hydraulic circuit for driving the automatic gear shift of FIG. 1.

The coupling and releasing of the clutches C0, C1, C2 and the brakes B0, B1, B2 are controlled by the hydraulic circuit shown in FIG. 2.

According to FIG. 2, a pressure regulating valve 703 which is controlled by a solenoid valve 48 for controlling the line pressure of the working oil pumped up from an oil tank 701 by an oil pump 702 regulates the hydraulic pressure of a line pressure circuit 704. As a line pressure circuit 704b is connected with the line pressure circuit 704 through the pressure regulating valve 703, it is connected with manual valves 705, 706, 707, 703 and 708, respectively, through a solenoid valve 41 controlling the clutch C0, a solenoid valve 42 controlling the clutch C2, a solenoid valve 43 controlling the brake B0, a solenoid valve 44 controlling the brake B1, and a solenoid valve 45 controlling the brake B2. The output of the oil pump 702 is directly connected with the manual valves 705, 706, 707, 708 and 709. Therefore, the clutches C0, C2 and the brakes B0, B1 are connected with the outputs of the manual valves 705, 706, 707 and 708. The output of the manual valve 709 is connected with the brake B2 through a valve 710, and the valve 710 is connected with a shift valve 711 through a solenoid valve 46 for stopping a "low" or "reverse" state. The shift valve 711 is again connected with the manual valve 706, and shift valve 711 moves according to the movements of shift lever and on its inner part is acted a pressure from the oil pump 702 when the state is beyond the P range. Furthermore, the oil pressure is exerted on the clutch C1 when it is in the "1st", "2nd", "3rd" and "OD" states. The oil pressure is then supplied to the manual valve 706 in range "L,2", and is supplied to the solenoid valve 46 for stopping the "low" and "reverse" states when it is in range "L,R".

According to this construction, the manual valve 705 moves when the solenoid valve 41, controlling the clutch C0, is open and the output of the oil pump 702 is exerted on the clutch C0, causing clutch C0 to be coupled. When the solenoid valve 41 controlling the clutch C0 is closed, no pressure is exerted on the clutch C0, and the clutch C0 is released.

When it is in states "1st", "2nd", "3rd" and "OD", the oil pressure is exerted on the clutch C1, making it coupled; in other conditions, no pressure is exerted on the clutch C1, and it is released.

In the case of the clutch C2, the manual valve 706 moves when the solenoid valve 42, controlling the clutch C2, is open, and then the pressure is exerted on the clutch C2 and the clutch C0 is coupled. When the solenoid valve 42, controlling the clutch C2, is closed, no pressure is exerted on the clutch C2 and it is released. But, the oil pressure is supplied to the manual valve 706 by the shift valve 711 when the range "L,2", and the movement has nothing to do with the movement of the solenoid valve 42 controlling the clutch C2, therefore the supply of pressure to the clutch C2 is cut off.

In the case of the brake B0, the manual valve 707 moves when the solenoid valve 43, controlling the brake B0, is open, no oil pressure is exerted on the brake B0, and the brake B0 is released. When the solenoid valve 43 controlling the brake B0 is closed, a pressure is exerted on the brake B0 and it is coupled.

In the case of the brake B1, the manual valve 708 moves when the solenoid valve 44, controlling the brake B1, is open, no oil pressure is exerted on the brake B1 and the brake B1 is released. When the solenoid valve 44, controlling the brake B1, is closed, then a pressure is exerted on the brake B1 and it is coupled.

In the case of the brake B2, the manual valve 709 moves when the solenoid valve 45, controlling the brake B2, is open, no oil pressure is exerted on the brake B2, and the brake B2 is released. When the solenoid valve 45, controlling the brake B2, is closed, a pressure is exerted on the brake B2 through the valve 710 and the brake B2 is coupled. But, when the solenoid valve, for stopping the "low" and "reverse" states when in ranges R and L, is on, a pressure will be exerted on the valve 710, then the supply of oil pressure to the brake B2 is cut off, and the brake B2 is released.

In other words, a valve 712 is a lock-up control valve. When a solenoid valve 47, for use of lock-up control, is on, the output shaft of engine is directly connected with the turbine rotation shaft 600, and is in the lock-up state.

All solenoid valves are driven by the electronic control circuits discussed below, and all clutches or brakes are controlled with the states shown in List 1 according to various working conditions. Further, each solenoid valve repeats its "on-off" state with a relatively high frequency through the following electronic control circuit, and regulates the opening of each manual valve by controlling its duty ratio. When the duty ratio becomes high, the opening of the manual valve becomes large, and the pressure from the oil pump 702 is rapidly exerted on each clutch and brake, making them move faster. If the duty ratio becomes low, the opening of the manual valve becomes small, and the pressure from the oil pump 702 slowly reaches each clutch and brake, making them move more slowly. Therefore, the moving speed of each clutch and brake can be regulated by controlling the duty ratio, and the shock which occurs in coupling each clutch and brake can be reduced and the transmission efficiency increased.

Figure 3:
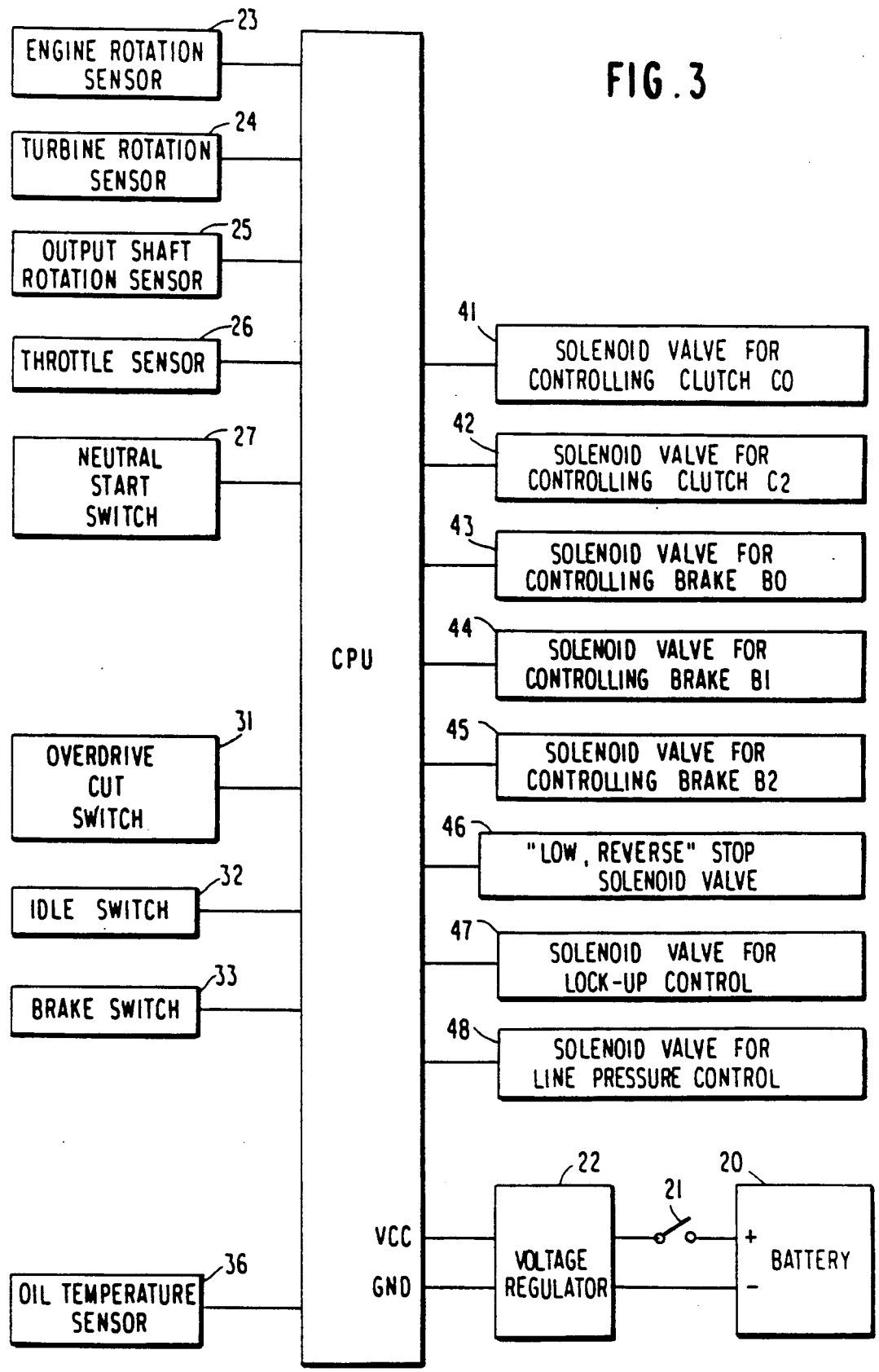
FIG. 3 shows the electronic control circuit for controlling the hydraulic circuit of FIG. 2.

FIG. 3 shows the electronic control circuit for driving each solenoid valve in the oil hydraulic circuit. The input terminal of a voltage regulator 22 is connected with the terminal of a vehicle battery 20 through an ignition switch 21. A terminal Vcc of the power supply of a central processing unit CPU and a terminal GND are respectively connected with the output terminals of a voltage regulator 22. The voltage regulator 22 transforms the output voltage from the battery 20 into a working voltage for the CPU.

The central processing unit CPU is connected to an engine rotation sensor 23, a turbine rotation sensor 24, an output shaft rotation sensor 25, a throttle sensor 26, a neutral start & switch 27, an over drive cut switch 31, an idle switch 32, a brake switch 33 and an oil temperature sensor 36. The interfaces of each sensor and switch are omitted in FIG. 3 for simplicity's sake.

The engine rotation sensor 23 detects the revolution of the vehicle engine. The engine rotation sensor 23 is located near the output shift of the engine, providing the pulse signals which correspond to the engine revolution. In the present embodiment, the engine rotation sensor is of the type of electromagnetic pick-up which is disposed at the position opposite to the tooth of the ring gear on the output shaft of the engine, and provides 120 pulse signals corresponding to one rotation of the ring gear. The output signals are then inputted to the central processing unit CPU.

The turbine rotation sensor 24 detects the revolution of the turbine. The turbine rotation sensor 24 is located near the turbine shaft, and provides the pulse signals which correspond to the revolution of the turbine. In the present embodiment, the turbine rotation sensor is of the type of electromagnetic pick-up which is disposed at the position opposite to the tooth of the gear on the turbine shaft 600, and provides 57 pulse signals corresponding to one rotation of the gear. The output signals are then inputted to the central processing unit CPU.

The output shaft rotation sensor 25 detects the revolutions of the output shaft of the automatic transmission. This output rotation sensor is located near the output shaft of the automatic gear shift, providing the pulse signals which correspond to the revolution of the output shaft of the automatic gear shift. In the present embodiment, the output shaft rotation sensor is of the type of electromagnetic pick-up which is located at the position opposite to the tooth of the gear on the output shaft, and provides 18 pulse signals corresponding to one rotation of the gear, and the output signals are then inputted to the central processing unit CPU. Furthermore, when the relationship between the output shaft of the automatic gear shift and the revolutions of the vehicle is known, the output shaft rotation sensor can be replaced by a vehicle speed sensor for detecting vehicle speed.

The throttle sensor 26 detects the opening of the throttle valve of the engine. Different types of throttle sensors 26 may be employed, such as a mechanical and digital type which detects the rotation angle of the throttle valve through switching and divides the opening of the throttle valve, and an electrical and analog type which transforms the rotation angle of the throttle valve into voltages and divides the opening of the throttle valve using an A/D converter. In the present invention, two types of throttle sensors are alternatively used, but only one type is needed in a normal system. The opening of the throttle valve is divided by the throttle sensor into 16 signals which are transmitted through four signal lines. Signal $\theta o$ represents the state of "completely closed", and signal $\theta 15$ represents the state of "completely open". Between $\theta o$ and $\theta 15$ are evenly spanned signals $\theta - \theta 14$.

The neutral start switch 27 detects the position of the shift lever. It has such switches as D (drive) range switch, L (low) range switch, 2 (second) range switch, 3 (third) range switch, N (neutral) range switch, R (reverse) range switch and P (parking) range switch, detecting various ranges of D, L, 2, 3, N, R and P, respectively.

The over drive cut switch 31 is operated by the driver to stop or permit (allow) the over drive. This over drive cut switch can be replaced by, for instance, an interface inputting the over drive out signal from the constant speed drive device in order to prevent an up-shift during a constant speed drive.

The idle switch 32 detects the idle state of the engine. The contact is "ON" during idling (the opening of the throttle is below 1.5% in the present embodiment).

The brake switch 33 detects the "on" or "off" state of the brake.

The oil temperature sensor 36 detects the oil temperature of the automatic gear shift. A high oil temperature switch and a low oil temperature switch are employed in the present embodiment. The high oil temperature switch is switched on when the temperature is over 120° C., and is switched off when it below 100° C. The low oil temperature switch is switched on when the temperature is below −10° C., and is switched off when it is over 0° C. The two oil temperature sensors in this embodiment can also be replaced by linear temperature sensors.

The central processing unit CPU is also connected to a solenoid valve 41 for controlling the clutch C0, a solenoid valve 42 for controlling clutch C2, solenoid valve 43 for controlling the brake B0, a solenoid valve 44 for controlling the brake B1, a solenoid valve 45 for controlling the brake B2, a solenoid valve 46 for stopping low and reverse shifting, a solenoid valve 47 for controlling lock-up, and a solenoid valve 48 for controlling the line pressure. The output interface or drive device of each solenoid is omitted in FIG. 3 for simplicity's sake. Each solenoid is controlled by the central processing unit CPU.

Inside the central processing unit CPU is disposed memories, timers, registers, RAM or ROM etc. When the ignition switch is switched on, a voltage is supplied to the CPU, and the main routine of FIG. 4 is executed.

Figure 4:
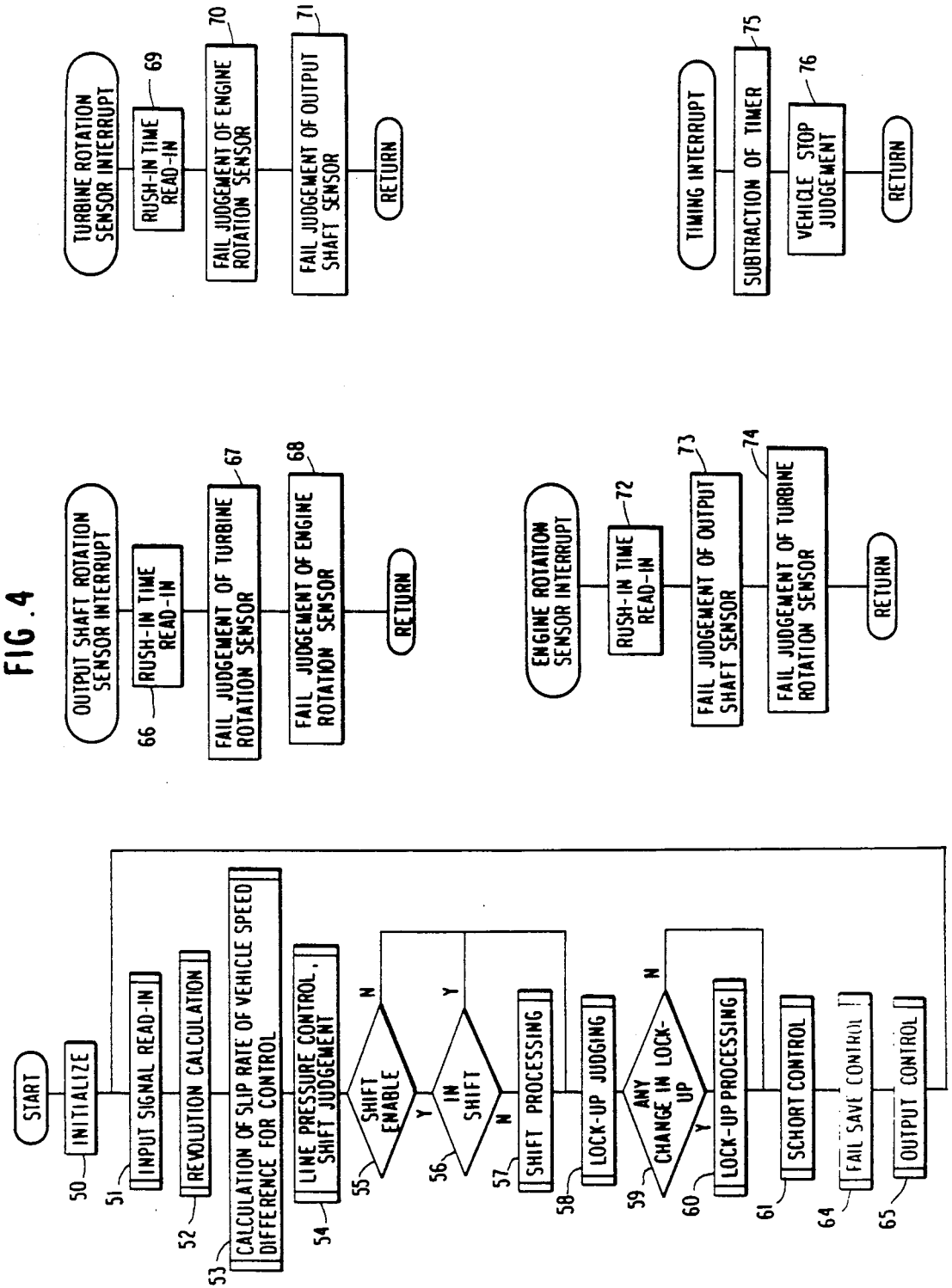
FIGS. 4A through 4E are the flowcharts of the main routine of the CPU of the electronic control circuit, the vehicle speed interrupt, the turbine rotation sensor interrupt, the engine rotation sensor interrupt and the timing interrupt routines.

FIG. 4 shows the flowcharts of a main routine of the central processing unit CPU, a vehicle speed sensor interrupt, the turbine rotation sensor interrupt, an engine rotation sensor interrupt and a timer interrupt.

Main Routine

After the START of the central processing unit CPU, the input/output direction of each input/output port is set, each memory is initialized and whether or not there is an interrupt set (step 50).

After that, the input/output read-in routine is executed, the read-in of the state of each sensor and switch connected to the input, and the removal of noise, as well as the setting of data corresponding to the state of each sensor and switch, are carried out (step 51). Here, a feedback disable flag is set according to temperature.

Next, the revolution calculating routine is executed, which routine calculates vehicle speed, the turbine revolutions and the engine revolutions (step 52).

The engine revolutions NE can be calculated with the following equation; however, as the output of the engine rotation sensor is of high frequency, it must be calculated after an octopartite frequency division.

$$NE = \frac{nE(i-1) + nEi}{2}$$

$$NE = \frac{PCEi}{TEi} \times \frac{\text{8th freq. div.}}{8 \times 10^{-6}} \times \frac{60}{120}$$

Where nEi: engine revolutions acquired from the present pulse.

TEi: time count to the initial one pulse edge which is 10 ms over the previous pulse.

PCEi: pulses in TEi.

$8 \times 10^{-6}$: least unit of detecting time (8 us).

The turbine revolution NT is calculated with the following equation. But as the output of the turbine rotation sensor is also of high frequency, it must be calculated after quadripartite frequency division.

$$NT = \frac{nT(i-1) + nTi}{2}$$

$$nTi = \frac{PCTi}{TTi} \times \frac{\text{4th freq. div.}}{8 \times 10^{-6}} \times \frac{60}{57}$$

Where nTi: turbine revolutions acquired from the present pulse.

TTi: time count to the initial one pulse edge which is 10 ms over the previous pulse.

PCTi: pulses in TTi.

The output shaft revolution NO is calculated with the following equation.

$$NO = \frac{nO(i-1) + nOi}{2}$$

$$NOi = \frac{PCOi}{TOi} \times \frac{1}{8 \times 10^{-6}} \times \frac{60}{18}$$

Where nOi: output shaft revolutions acquired from the present pulse.

TOi: time count to the initial one pulse edge which is 10 ms over the previous pulse.

PCOi: pulses in TOi.

The initial output shaft revolution No after the stop of the vehicle (which is judged in the timer interrupt routine described later) is calculated as follows:

$$NO = (144 + nOi)/2.$$

As the gear ratio of the output shaft, the vehicle shaft and the wheel radius can be known beforehand, the vehicle speed can be acquired from the output shaft revolutions NO.

The vehicle acceleration AG can be calculated with the following equation.

$$AG = \frac{NOi - NO(i-1)}{TOi} \times \frac{1}{8 \times 10^{-6}}$$

When $NOi \geq NO(i-1)$, and the calculation immediately after the vehicle stops is as follows:

$$AG = \frac{NOi - 144}{TOi} \times \frac{1}{8 \times 10^{-6}}$$

AG becomes maximum (YFF) when $NOi < NO(i-1)$.

In the next step 54, the line pressure control and shift control routine are executed; the setting and control of line pressure, the setting of the control mode and the judgment of shifting are carried out. The line pressure value is set according to the opening of the throttle valve and the turbine revolutions. The line pressure solenoid valve is duty-driven according to the set value.

In shift control, whether or not there is a shift is judged according to a shift map drawn before hand with respect to the throttle opening, vehicle speed and the present shift range.

After the above-mentioned process, when a shift enable is judged in the line pressure and shift control routine, and it is not presently in the shift state, a shift processing routine is executed and the shift processing is carried out.

In the next step 58, the lock-up judging routine is executed. In the case of a lock-up change (step 59), the lock-up processing routine is executed and the lock-up processing is carried out (step 60). Here the engine brake control is considered as a part of the lock-up processing. In this case, when the throttle opening is completely closed (idle contact is on) and the set vehicle speed (15 km/h) is exceeded, the lock-up solenoid is switched on and is directly connected so as to couple the engine brake when the engine revolutions, which have nothing to do with the shift range, are presently less than the turbine revolutions. When the idle contact is off, or the engine revolutions are larger than the turbine revolutions, a shift judgment is conducted according to the present shift range after a 0.6 sec. delay.

In the next step 61, the schort control routine is executed. When the range is shifted out of the neutral range as the vehicle stops, a schort control for buffering the shock through temporarily shifting the shift range into the third shift range, is carried out.

Next, the fail save control routine is executed to conduct the fail save processing (Step 64).

Finally, the output control routine is executed to control the output of solenoids (Step 65).

Here the feedback is conducted according to the previously set feedback disable flag. When the temperature of the working oil of the transmission is below a definite temperature (0° C.), the system is forbidden to use the over drive range (4th range) and no feedback control during shifting (feedback caused by engine rotation relating to the rise and fall of the coupling pressure and the releasing pressure of solenoid) is carried out. By doing that, an erroneously set shift timing can be avoided which is caused by the non-uniformity of the oil viscosity when the vehicle is going in the cold region i.e., the vehicle is being operated without allowing time for the oil to warm or heat up.

Interrupt Routine

When the outputs of the output shaft rotation sensor, the turbine rotation sensor and the engine rotation sensor are connected to the interrupt input terminals of the central processing unit CPU, the interrupt routines of the output shaft rotation sensor, the turbine rotation sensor and the engine rotation sensor will be executed when there is a change in the voltage level at the interrupt terminal, In executing the interrupt routine of the output shaft rotation sensor, the time for interrupt is first read from the timer, and at the same time, the operational flag for calculating the output shaft revolutions is set to "on". At the following step, any troubles with the turbine rotation sensor and the engine rotation sensor are judged (Steps 66–68). This trouble judgment is conducted through the comparison of the output shaft revolutions with the turbine revolutions and the engine revolutions.

In executing the interrupt routine of the turbine rotation sensor, the time for interrupt is first read from the timer. Here, in order to do quadripartite frequency division with the input pulse, the operational flag for calculating the turbine revolutions is set to "on" when a 4th interrupt is counted. Then the troubles of engine rotation sensor and output shaft rotation sensor are judged (Steps 69-71). This trouble judgment is conducted through the comparison of the turbine revolutions with the engine revolutions and the output shaft revolutions.

Further, the frequency division operation can also be conducted by a frequency dividing circuit disposed between the central processing unit CPU and the rotation sensor.

In executing the interrupt routine of the engine rotation sensor, the time for interrupt is read from the timer. Here, in order to do octopartite frequency division with the input pulse, the operational flag for calculating the engine revolutions is set to "on" when an octopartite interrupt is counted. Then the troubles of the output shaft rotation sensor and the turbine rotation sensor are judged (Step 70-74). This trouble judgment is conducted through the comparison of the engine revolutions with the output revolutions and the turbine revolutions.

Further, the frequency division operation can also be conducted by a frequency dividing circuit disposed between the central processing unit CPU and the rotation sensor.

In the central processing unit CPU, a timing interrupt will occur after each predetermined time delay. In the present embodiment, a timing interrupt routine is executed for every 4 ms, where all the subtraction calculations of the timer for control must be carried out (Step 75). Next, the judgment of vehicle stop is conducted (Step 76). In the present embodiment, a vehicle stop will be determined when the vehicle stop speed Nstop is below 144 rpm (about 3 km). Furthermore, the vehicle is judged to be in stop when there are no pulses having frequencies more than Tstop=23.13 ms inputted to the central processing unit CPU.

Each control process will now be described in detail according to a flowchart.

Input Signal Read-in Routine

Figure 5:
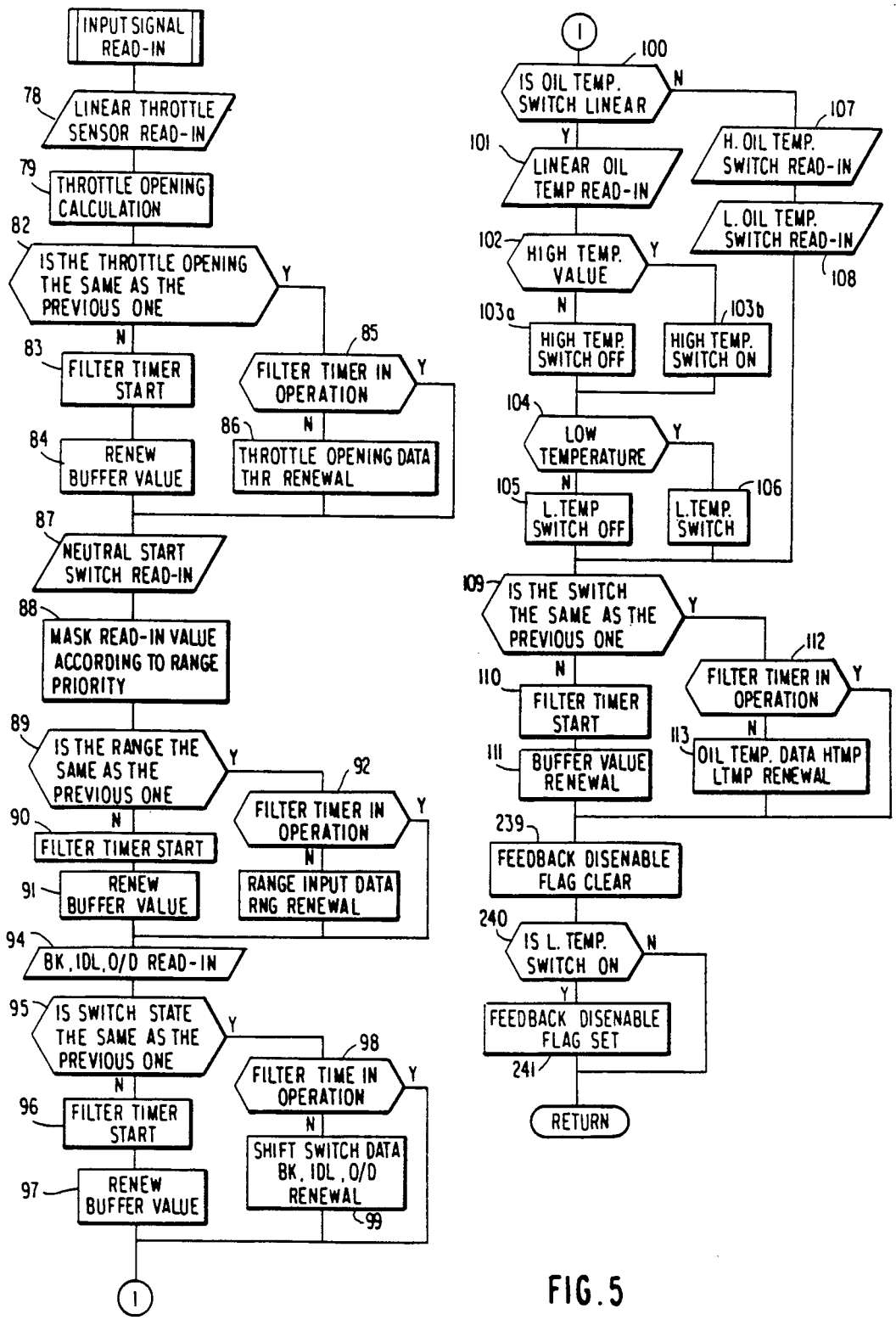
FIGS. 5A and 5B are the flowcharts of the input signal read-in routine of the CPU of the electronic control circuit shown in FIG. 3.

FIG. 5 shows the flowchart of the input signal read-in routine.

In executing this routine, the output value of the throttle valve sensor 26 is first read in, and the opening of the throttle is calculated (Steps 78, 79). When the calculation result is different from the previous throttle opening, then the filter timer is started and the calculation result is stored in the throttle opening buffer (Step 82-84). When the calculation result is the same as the previous throttle opening after the end of the timing in the filter timer, then the data which have been stored in the throttle opening buffer are put into the throttle opening data THR (Steps 82, 85, 86). By doing that, the throttle opening data THR will be renewed only when the output value from the throttle sensor is a definite one during the period from the start to the end of the timing in the filter timer. Therefore, even if the output from the throttle sensor has noise, the noise can be removed.

Next, the read-in processing of the neutral start switch 27 is performed (Steps 87-93). The output from the neutral start switch is read in, and the range input data RNG is renewed after the end of the timing in the filter timer, as in the case of the throttle opening.

Next, the read-in processing of the brake switch 33, the idle switch 32, and the over drive cut switch 31 is carried out (Step 94-99). The output from each switch is read-in, and the shift switch data BK, IDL and O/D are renewed after the end of the timing in the filter timer, as in the case of the throttle opening.

Next, the output of the oil temperature sensor is read-in. Here, first of all, when the oil temperature sensor is judged in Step 100 to be of the linear type, an output from the linear type oil temperature sensor is read-in (Step 101). When the read-in value is higher than the set temperature value (Step 102), the high temperature switch is on (103($b$)) and the low temperature switch is off (103($a$)); when the read-in value is lower than the set temperature value, the high temperature switch is off and the low temperature switch is on; and in other cases the two switches are off (Steps 100-106). When the oil temperature sensor is composed of a high temperature switch and a low temperature switch, then the values from both switches are read-in (Steps 107, 108). Like the case of the throttle opening, the high temperature data HTMP, and the low temperature data LTMP, are then renewed after the end of the timing in the filter timer.

The feedback disenable flag is thereafter cleared, and the feedback disenable flag is set only when the low temperature switch is on (Steps 239-241).

After the end of the aforementioned processing, the program returns to the main routine.

Output Control Routine

Figure 6:
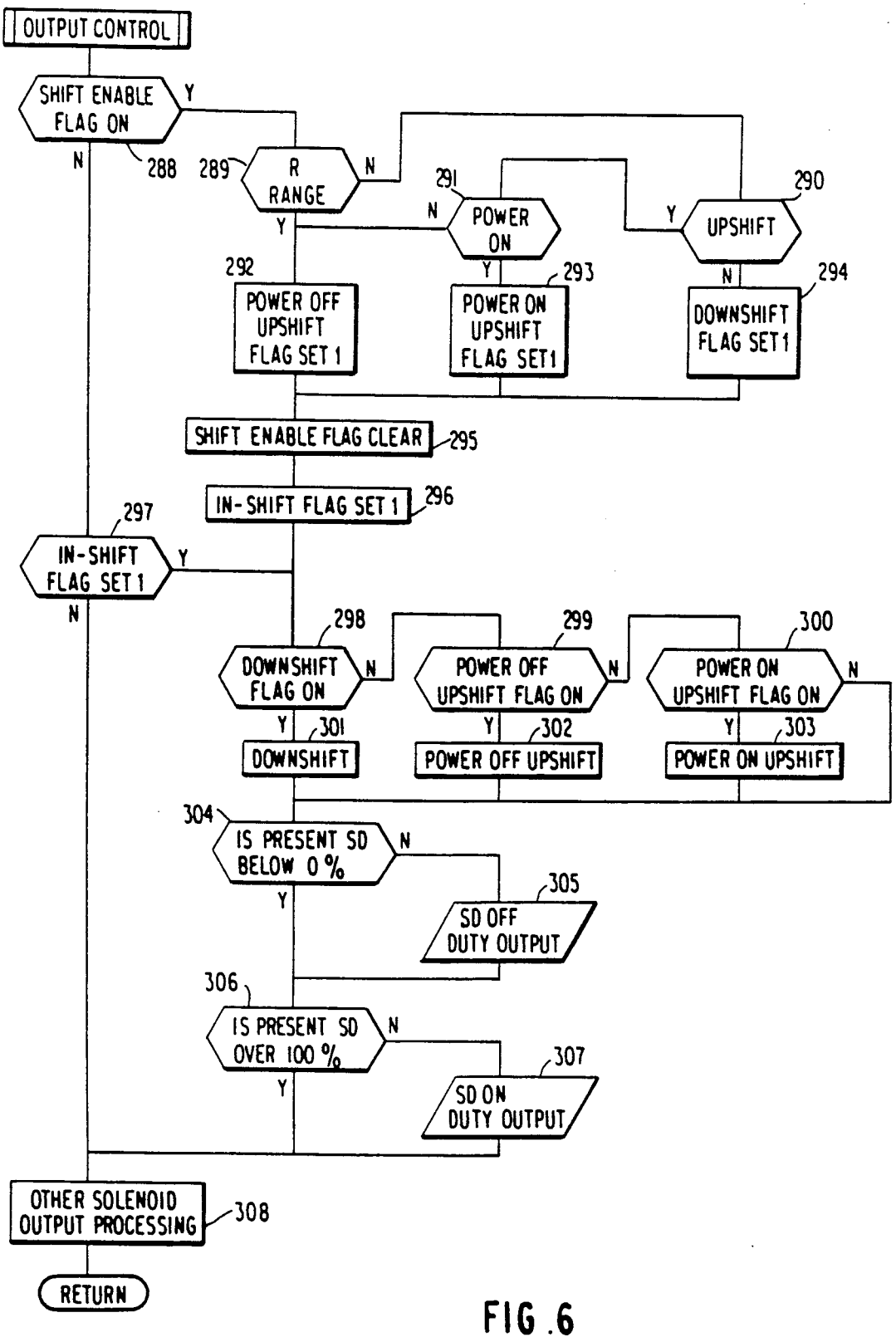
FIG. 6 is the flowchart of the output control routine of the CPU of the electronic control circuit shown in FIG. 3.

FIG. 6 is a flowchart of the output control routine.

When the shift enable flag is judged to be set to "ON" (Step 288), and when it is judged to be in an R range (Step 289), and upshift and the power is off ($\theta < \theta_2$; or the idle switch is on), the power off-upshift flag is set, the shift enable flag is cleared and the in-shift is set (Steps 292, 295, 296).

When it is out of the R range and upshift, and the power is on ($\theta > \theta_2$), the power ON upshift flag is set, the shift enable flag is cleared and the shift in-flag is set (Steps 293, 295, 296). When it is out of the R range, the downshift flag is set, the shift, enable flag is cleared and the shift in-flag is set (Steps 294, 295, 296). When the shift enable flag is on or the shift in-flag is on, the downshift routine is executed if the downshift flag is on; the power off-upshift routine is executed if the power off-upshift flag is on; and the power on-upshift routine is executed if the power on-upshift flag is on (Steps 297-303). When the duty ratio SDOFF of the solenoid valve at a releasing side is set, and each shift routine is not below 0%, the solenoid valve at the releasing side is controlled with the duty ratio SDOFF (Steps 304, 305). Furthermore, when the duty ratio SDON of the solenoid valve at the coupling side is not over 100%, the solenoid valve at the coupling side is controlled with the duty ratio SDON (Steps 306, 307). The solenoid valve at the coupling side, and that at the releasing side, are set each time a shift occurs. The solenoid valve of each shift is shown in the following list.

| | List 2 | |
|---|---|---|
| shift range | release side | coupling site |
| 1-2 | B2 | B1 |
| 1-3 | B2 | C2 |
| 1-4 | B2, C0 | B0, C2 |
| 1-N | B2 | — |
| 1-R | — | C2 |
| 2-3 | B1 | C2 |
| 2-4 | B1, C0 | B0, C2 |

-continued

List 2

| shift range | release side | coupling site |
|---|---|---|
| 2-N | B1 | — |
| 2-R | B1 | B2, C2 |
| 3-4 | C0 | B0 |
| 3-N | C2, C0 | — |
| 3-R | — | B2 |
| 4-N | B0, C2 | C0 |
| 4-R | B0, B2 | C0 |
| N-R | — | B2, C2 |

When in a reverse shift, the solenoid valve at the coupling side, and that at the releasing side, operate reversely.

When it is necessary to change the state of another solenoid valve, such as the lock-up control solenoid valve, a signal is outputted to drive the solenoid valve and the program returns to main routine thereafter.

Power On-Upshift Routine

Figure 7A:
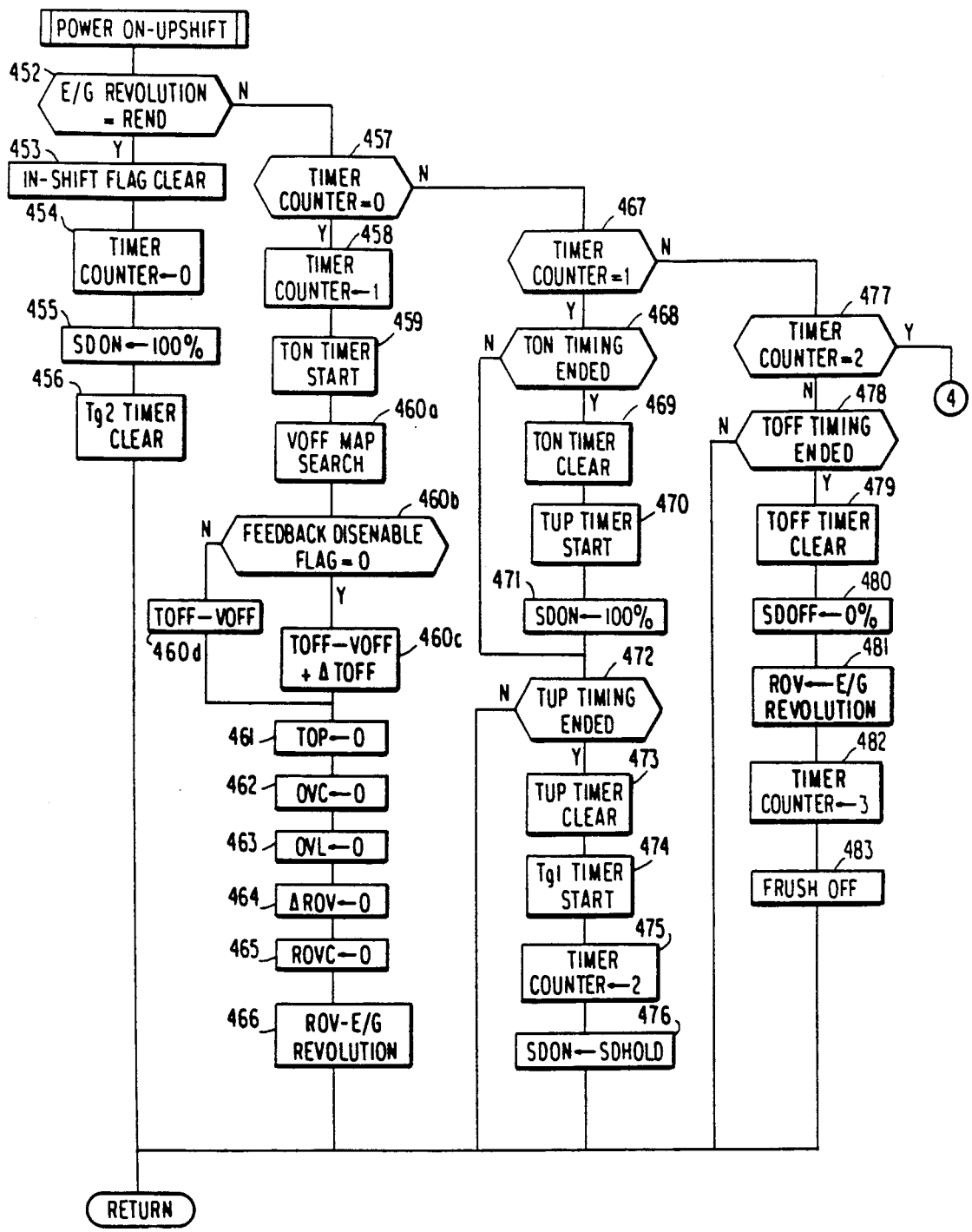
FIGS. 7a, 7b and 7c are flowcharts of the power on-upshift subroutine of the output control routine shown in FIG. 6.
Figure 7B:
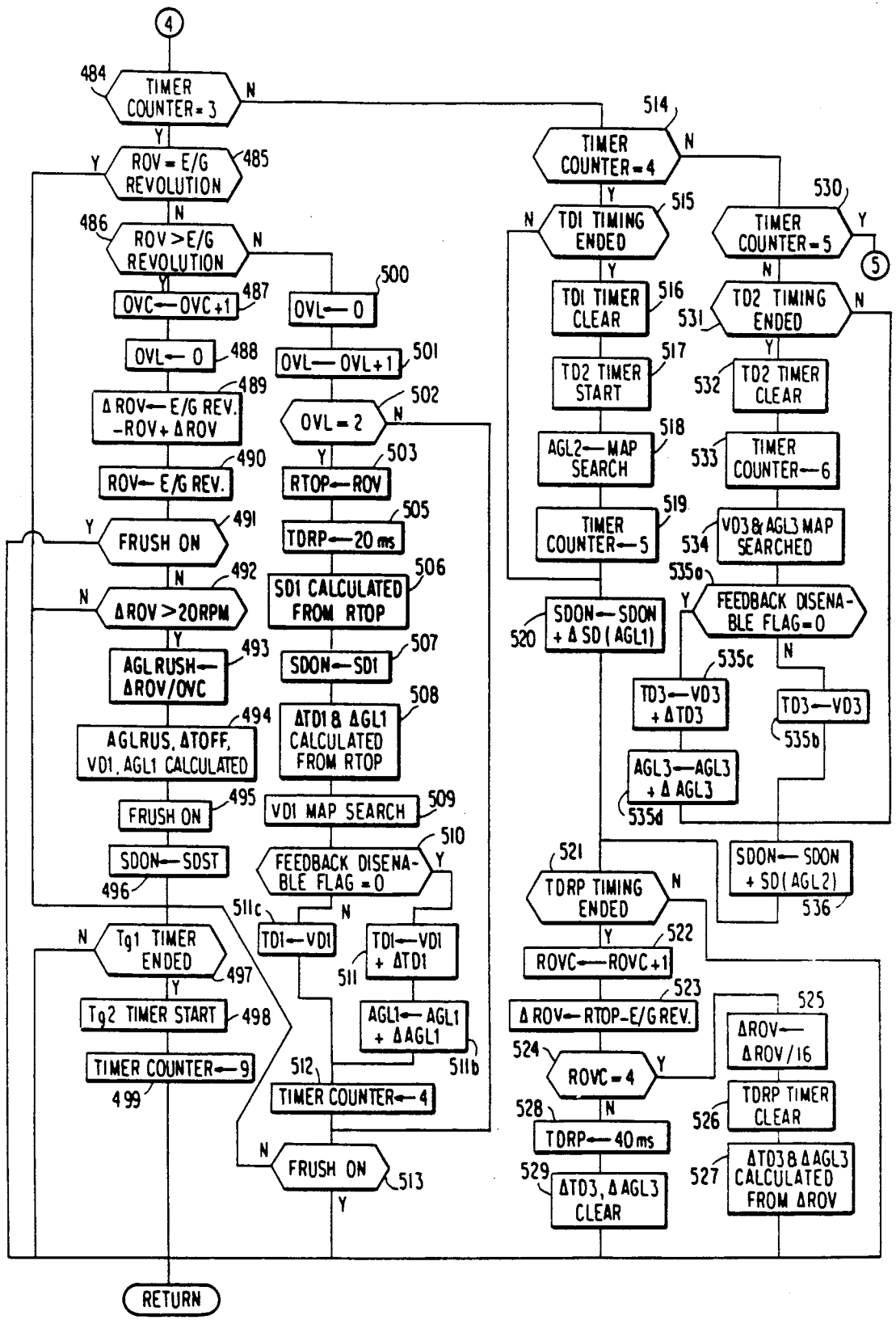
Figure 7C:
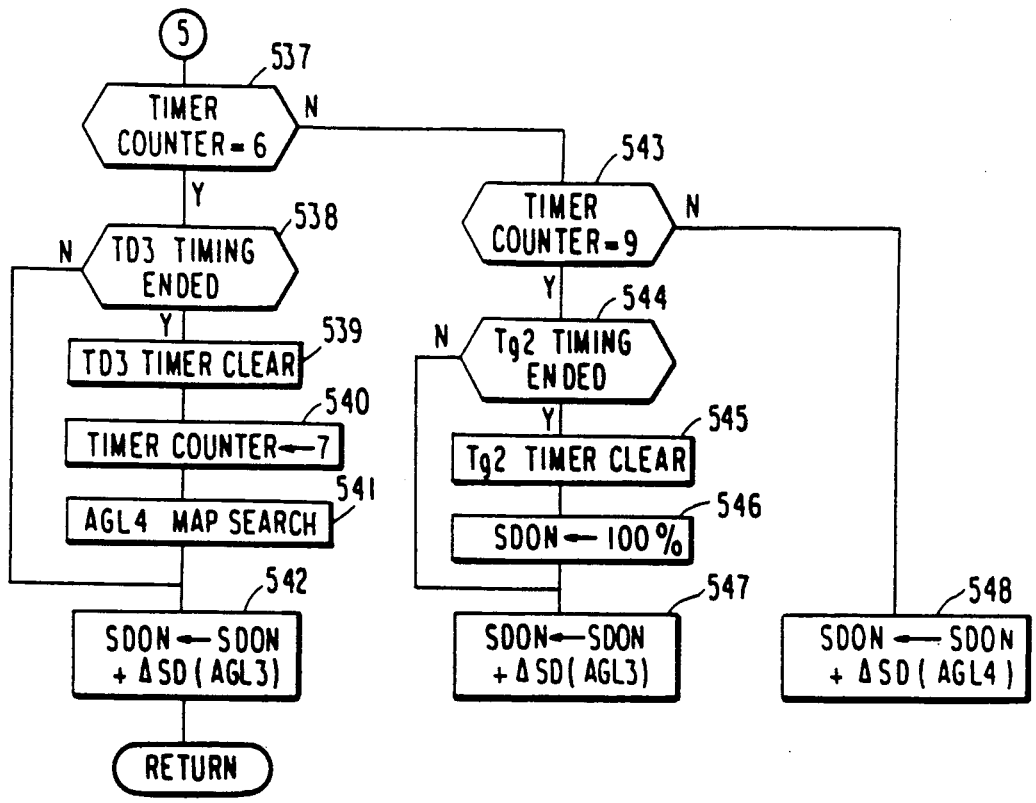

FIG. 7a, FIG. 7b and FIG. 7c are the flowcharts of the power on-upshift routine.

In executing the routine, the value of the timer counter is read out from 0 to 6 successively, and a processing is carried-out for each value of the timer counter.

In the routine, the engine revolution NE is monitored and judged to see if it has reached the set value REND (Step 452). REND is an engine revolution which may be reached after the end of shifting. It is calculated as (the next shift range) X (vehicle speed) when judging the shift (which is not shown in the Figure). Therefore, Step 457 is executed just at the beginning of shifting for NE≠REND. In the shift process, once NE=REND, a shift ending processing is carried-out at Steps 453-456. Because the timer counter is cleared in the shift processing (Step 454), steps which are below Step 458 are always the first to be executed when shift begins.

(1) timer counter=0.

When the timer counter is equal to 0 immediately after the shift judgment, Steps 458-466 are executed. For the reason of the following processing, let the timer counter be equal to "1" (Step 458), the timer counter is set and the timer TON is started (Step 459). In the timer TOn, a time from the beginning at the shift judgment to the moment when the solenoid valve at the coupling side is 100% coupled is set.

Next, when it is judged in Step 460(b) that the feedback disenable flag is "0", the value of the timer TOFF is set to be the sum of the value VOFF (which is set by means of the map search according to the shift condition) and the value ΔTOFF (which is calculated from the engine up shift peak value R top in the previous shift range). When the feedback disenable flag is "1", correction cannot be carried out according to ΔTOFF (Step 460). The value ΔTOFF is a basic time counted up to the release of the solenoid valve at the releasing side, and is taken as the correction value. As the timer TOFF must perform a subtraction operation according to timing interrupt after being set, subtraction is started at the exact moment the interrupt begins. After that, memories for controlling TOP, OVC, OVL, ΔROV and ROVC are cleared (Steps 461-465). The present engine revolutions. i.e., the engine revolutions at the beginning of the control process are set in memory ROV (Step 466).

The next step is to return to the main routine through the output control routine.

(2) timer counter=1.

When it is determined in Step 467 that the timer counter is set to "1" (when the timer counter is "0"), Steps 468-476 are executed when the next power on up-shift routine is executed.

The next step is to judge whether or not the timing in the timer TON, which started at the moment when the timer counter=0, has ended. When it has ended, the timer TON will be cleared (Step 469), and the memory SDON is set to 100% at the same time when the TUP timer is started (Steps 470-471). The value of the memory SDON is considered the duty ratio of the solenoid value at the coupling side during output control. Through this processing, the duty ratio of the solenoid valve at the coupling side becomes 100%, i.e., completely coupled. A time value, which is a time for the solenoid valve at the coupling side to be 100% coupled, is set in the timer Tup.

The next step (472) is to judge whether or not the timing in the timer TUP has ended. When the timing in the timer TUP has ended, the timer TUP is cleared (Step 473), a searched value according to the map is set in the timer Tg1 which is then started (Step 471), and in the memory SDON the value is replaced with the value SD HOLD after the timer count is set to "2" (Steps 474-476). SD HOLD is a duty ratio which is equivalent to the highest level of oil pressure when the manual valve does not move, and the response of the next movement becomes better when the duty ratio is added in.

In this way, the duty ratio of the solenoid valve at the coupling side becomes 100% from the moment the timer TON ends to the moment the timer TUP ends. At the end of timing in the timer TUP, the duty ratio of the solenoid valve, at the coupling side, becomes the value SD HOLD. The time, which is needed to fix in value SD HOLD the duty ratio of the solenoid valve at the coupling side when there is no upshift for the engine rotation during shifting, is set as a limit time in the timer Tg1.

(3) timer counter=2.

As the timer counter is set to "2", when timing in the timer Tup has ended, the power on-upshift routine is then executed and Steps 478-483 are executed (Step 477).

The next step is to judge whether or not the timing in the timer TOFF, which started the moment when the timer counter=0, has ended. When it has ended, the timer TOFF will be cleared (Step 479): the memory SDOFF is set to 0% (Step 480); the present engine revolution is set into memory Rov (Step 482); the timer counter is set to 3" (Step 482) and flag FRUSH is set to "ON" (Step 483). In this way, the solenoid valve at the release side will maintain the duty ratio before the shifting judgment during the operation of the timer TOFF; when the timing in the timer TOFF has ended, a duty ratio of 0% is reached and the valve is fully released.

(4) timer counter=3.

Referring to FIG. 7b, as the timer counter is set to "3", when the timing in the timer TOFF has ended, Steps below Step 485 are executed when the power on-upshift routine is then carried out (Step 484).

First, a check is performed against the value Rov to see whether or not there is a change in the engine revolutions (Step 485). At the moment when the timer counter=3, value Rov becomes the engine revolution at the moment when timing in the timer TOFF has ended (i.e., when the solenoid valve at the release side is released). In the present embodiment, as the input of engine rotation undergoes an octopartite frequency division, the engine revolution NE does not change during one cycle of the main routine. Because most part which is processed at Step 485 is skipped, the present engine revolution must be checked against the value Rov to see if it has increased or decreased in the case when there is a change in engine revolution (Step 486). If there is an increasing change in the revolution, the value of the memory OVC is increased by 1 (Step 487), the memory OVL is cleared (Step 488), a value which is acquired from the present engine revolutions subtracted by the value Rov is added to the value $\Delta$Rov, and the value $\Delta$Rov is renewed into the present engine revolution (Steps 489-490). The value Rov is the difference between the present engine revolution and the engine revolution prior to the change in engine rotation. Further, the times needed to renew the value $\Delta$Rov is counted in the memory OVC.

The next step is to judge whether or not the flag FRUSH is on (Step 491). As the flag FRUSH is off when the timer counter=2, $\Delta$Rov is checked to see whether or not it is over 20 rpm (Step 492). This operation is continued until $\Delta$Rov is over 20 rpm and the flag FRUSH is set to "on" at Step 495. If value $\Delta$Rov becomes over 20 rpm, value AGLRUSH is replaced by $\Delta$Rov/OVC (Step 493), and $\Delta$TOFF, VD1 and AGL1 are calculated from value AGLRUSH (Step 494). VD1 and AGL1 represent the control time and control value for the solenoid valve at the coupling side. As value AGLRUSH is the quotient of the difference of engine revolution between the present value and the value previous to engine revolution change divided by the times for renewing value $\Delta$Rov, (i.e., the value corresponding to the difference between the present time and the time previous to engine revolution change), it is the value equivalent to the upshift speed of the engine rotation. When both the solenoid valve at the release side and the solenoid valve at the coupling side are released, the duty of the solenoid valve at the coupling side is SDHOLD. As this duty is the duty ratio corresponding to the highest non-working pressure, the solenoid valve at the coupling side can be considered to be released. The upshift speed of engine rotation is large if the duty of the vehicle is large and vice versa. Therefore, the vehicle duty can be derived from the value of AGLRUSH. As values $\Delta$TOFF. VD1 and AGL, used for shifting, are changed according to the value equivalent to the vehicle duty suitable shifting to the vehicle duty can be conducted.

The flag FRUSH is set to "ON" thereafter, and the value SDON is replaced with SDst (Step 495-496).

At Step 486, if the engine revolution moves toward a decreasing direction, the memory OVC is cleared (Step 500), and OVL is increased by 1.

At the next step, when the value in the memory OVL is not 2, then the program jumps to Step 513 and returns to the main routine thereafter. If the value in the memory OVL is 2 (i.e., the engine revolution has two times, in succession, been in a decreasing direction), then the value Rov, which is previously set, is taken as the maximum engine revolution RTOP (Step 503), 20 ms is put into the timer TDRP, and the timer TDRP is started (Step 505). As each calculation of engine rotation needs about a period of 10 ms, the period is 20 ms from the moment when the engine shifts down to the moment when the value in the memory OVL becomes 2. The value SD1 can be derived from the maximum engine revolution RTOP, and SD1 is set to be the duty of the solenoid valve at the coupling side (Steps 506 and 507). Furthermore, values $\Delta$TD1 and $\Delta$AGL1 can be calculated from the maximum engine revolutions RTOP (Step 508). The next step is to read out value VD1 from the map according to the operation state (Step 509). It is then judged whether the feedback disenable flag is 0 (Step 510), and if it is, then the value which is the sum of VD1 plus $\Delta$TD1 is set to the timer TD1 (Step 511), the timer TD1 is started and $\Delta$AGL1 is added to AGL1 for correction (Step 511*b*). When the feedback disenable flag is 1. VD1 is set to the timer TD1 (Step 511) without any change, and the timer TD1 is then started. The timer counter is set to "4" thereafter (Step 512).

When the timer counter=3, and when the engine revolution is not more than 20 rpm of the revolution at the releasing of the solenoid valve at the release side and does not continue to rise, and again when the timing in the timer Tg1 has ended, timing in the timer Tg2 is started and the timer counter is set to 9 (Steps 497-499). Usually, when both solenoid valves at the release side and at the coupling side are released, no duty is exerted on the engine and the engine shifts up. But, before the engine revolution reaches over 20 rpm in a definite period, an extra processing of the timer counter=9 is carried out.

(5) timer counter=4.

When the engine revolution begins to drop, the timer counter is set to "4" (Step 514), steps below Step 515 will be executed if the following power on-upshift routine is executed (Step 514).

When the timing in the timer TD1 has not ended whenever a processing of the timer counter=4 is executed, a value $\Delta$SD, (AGL1) based on the value AGL, is added to the duty ratio of the solenoid valve at the coupling side (Step 520).

After that, when the timing in the timer TDRP is ended, the value in the memory Rovc is increased by 1, and the difference of the maximum engine revolution subtracted by the present engine revolution is put into $\Delta$ROV. When the value of the memory Rovc is not 4, a value of 40 ms is put into the timer TDRP and the timer is started again; $\Delta$TD 3 and $\Delta$AGL3 will be cleared (Steps 524, 528, 529). The value of the memory ROVC becomes 4, i.e., when four timing operations in the timer TDRP are finished, (the time period from the moment when the engine revolution begins to drop to the moment when the first timing operation in the timer TDRP begins is about 20 ms, the first operation in the timer TDRP needs 20 ms and each of the following three operations in the timer TDRP needs 40 ms, all time added together is 160 ms). $\Delta$Rov is divided by 16 and the quotient is used to renew $\Delta$Rov ($\Delta$Rov is then an amount by which the engine revolution has dropped, on average, in a 10 ms period). The timer TDRP is cleared and $\Delta$TD3 and $\Delta$AGL3 are calculated out from the value Rov (Steps 524-527). When the time counter is set to 4, the timer TD1 will be cleared after the timing in TD1 has ended, and timing in the timer TD2 is started; AGL2 is calculated and the timer counter is then set to "5" (Steps 515-520).

(6) timer counter=5.

As the timer counter is set to 5 when the timing operation in the timer TD1 has finished, steps below Step 531 are to be executed if the following power on-upshift routine is executed (Step 530).

When operation in the timer TD2 has not ended, each time when a processing of the timer counter=5 is performed, a value ΔSD (AGL2) based on value AGL2 is added to the duty ratio of the solenoid valve at the coupling side (Step 536). The program then skips to Step 521 of the timer counter=4, and a similar processing is carried out, i.e., ΔTD3 and ΔAGL3 are calculated after the end of four operations in the timer TDRP in a period from the moment when the engine revolutions begin to drop to the moment when the timing in the timer TD2 has ended. (A time period of 160 ms counted from the beginning of the drop of engine revolution.)

After the timing in the timer TD2 has ended, TD2 is cleared, and the timer counter is set to 6 (Steps 532, 533). The next step is to search value VD3 from the map according to the operation state. After that, when the feedback disenable flag is "0", ΔTD3 is added to VD3 and the sum is set into the timer TD3, which is then started. But when the feedback disenable flag is "1", value VD3 is directly set into the timer TD3 without any change (Steps 534-535). The value of ΔTD3 is "0" during the period of 160 ms counted from the moment when the engine revolution begins to drop, and is derived from the average drop value ΔRov dropped in 160 ms after the period of 160 ms.

(7) time counter=6.

As the timer counter is set to "6" when the timing operating in the timer TD2 is finished, steps below Step 538 are to be executed if the following power on-upshift routine is executed (Step 537).

When the operation in the timer TD3 has not ended, a value ΔSD (AGL3) based on value AGL3 is added to the solenoid valve at the coupling side each time a processing of the timer counter=6 is performed (Step 542).

After the operation in the timer TD3 has ended, the timer TD3 is cleared, the timer counter is set to 7 and the value AGL4 is then calculated (Step 538-541).

(8) timer counter=7.

As the timer counter is set to "7" when the timing operation in the timer TD3 has ended. Step 548 is to be executed if the following power on-upshift routine is executed. Here the value ΔSD (AGL4), based on AGL4, is added to the duty ratio of the solenoid valve at the coupling side.

(9) timer counter=9.

When the timer counter is 3 and the engine revolution does not exceed 20 rpm in a definite time period, an extra processing of the timer counter=9 is performed. A value ΔSD. (AGL3) based on value AGL3, is added to the duty ratio of the solenoid valve at the coupling side before the timing operation in the timer Tg2 has ended. When the operation in the timer Tg2 has ended, the timer is cleared, the duty ratio of the solenoid valve at the coupling side is set to 100% and the valve is fully coupled.

(10) end of power on-upshift.

During the period of aforementioned processing, if the engine revolution becomes the revolutions REND which are reached at the end of shifting, then the in-shift flag is cleared, the value of the timer counter becomes "0", the duty ratio of the solenoid valve at the coupling side is set to 100%, then the timer Tg2 is cleared and the control of power on-upshift is ended.

Figure 10:
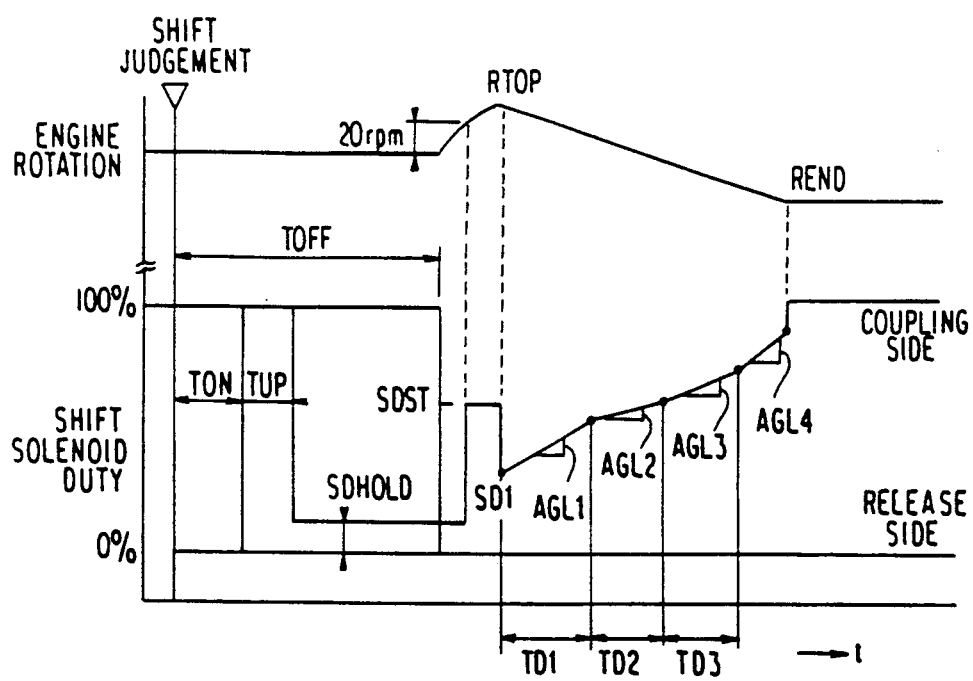

The aforementioned processing flowcharts are shown in FIG. 10 as a time chart. The duty ratio of the solenoid valve at the coupling side becomes 100% TON seconds after the beginning of shift judgment and again becomes SDHOLD % Tup seconds thereafter. When the engine revolution increases to more than 20 rpm, the duty ratio of the solenoid at the coupling side becomes SD1% when the engine revolution gets to a maximum value. After that, the duty curve in FIG. 10 rises at a slope of AGL1 during a TD1 second period, rises at a slope of AGL2 during the following TD2 second period, continues to rise at a slope of AGL3 during the following TD3 second period and finally rises at a slope of AGL4. When the engine revolution reaches REND during this period, the duty ratio of the solenoid valve at the coupling side is set to 100% and the whole control is ended. The duty ratio of the solenoid valve at the coupling side becomes 0% TOFF seconds after the beginning of the shift judgment.

Power Off-Upshift Routine

Figure 8A:
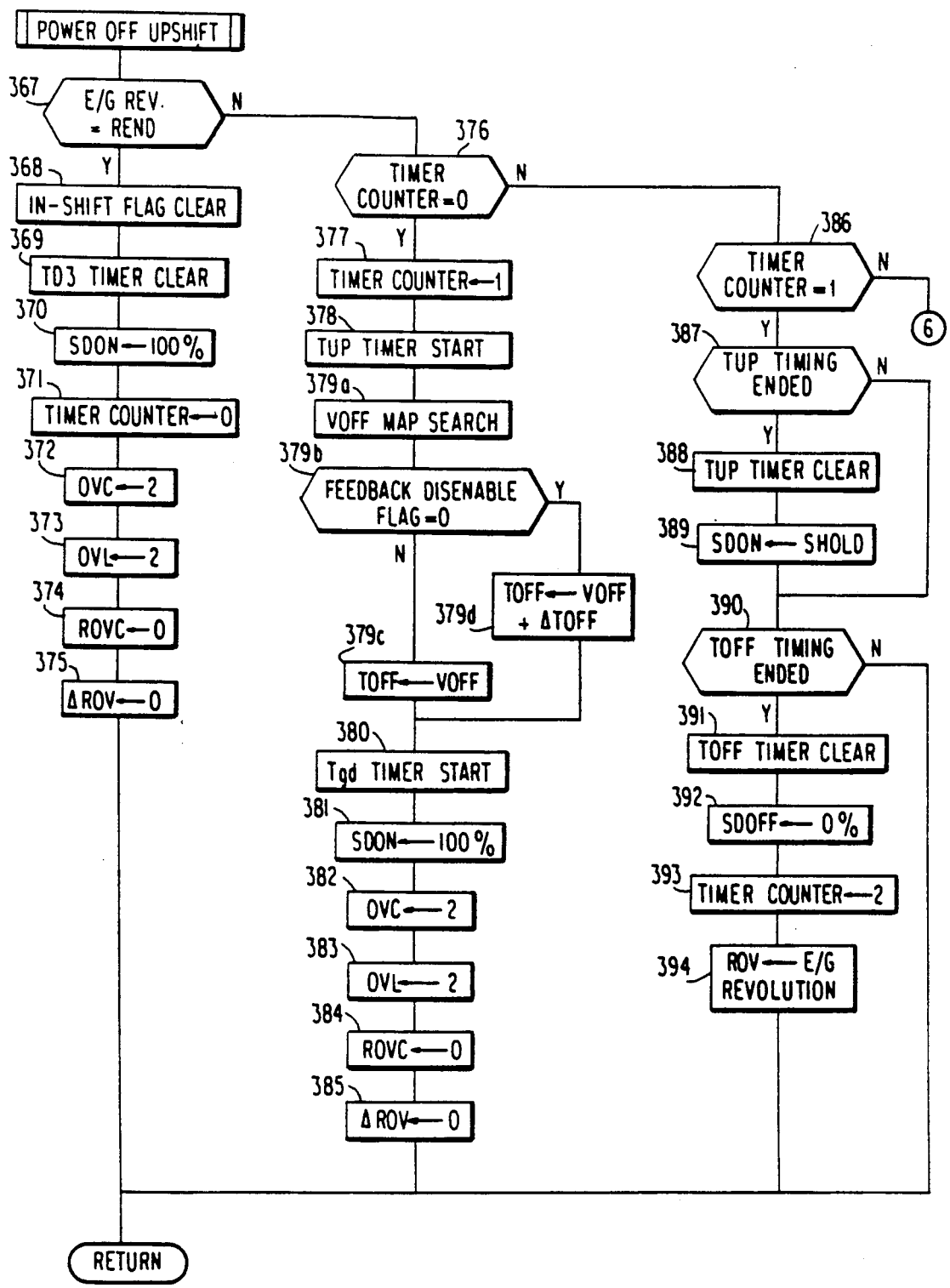
FIGS. 8a, 8b and 8c are flowcharts of the power off-upshift subroutine of the output control routine shown in FIG. 6.
Figure 8B:
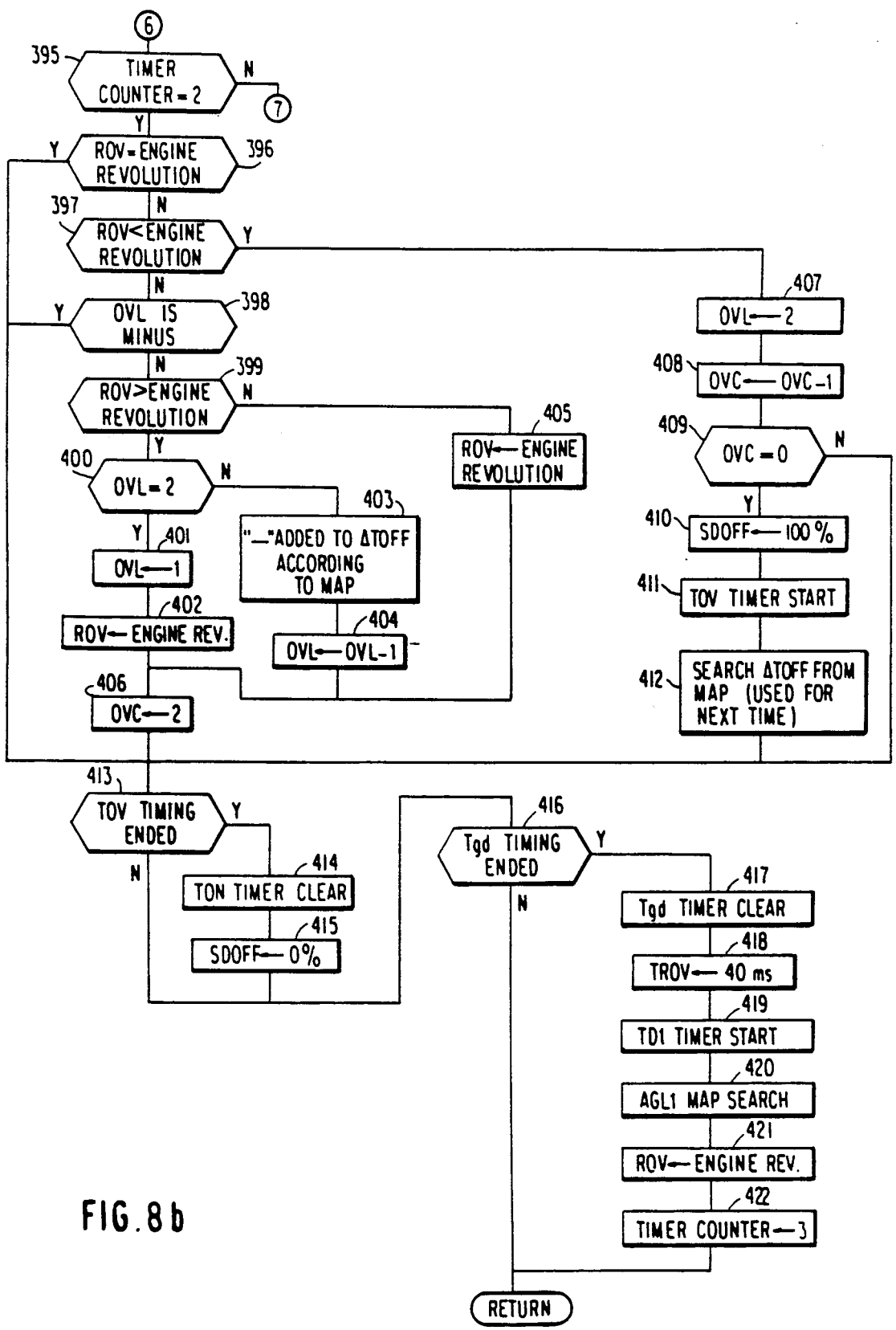
Figure 8C:
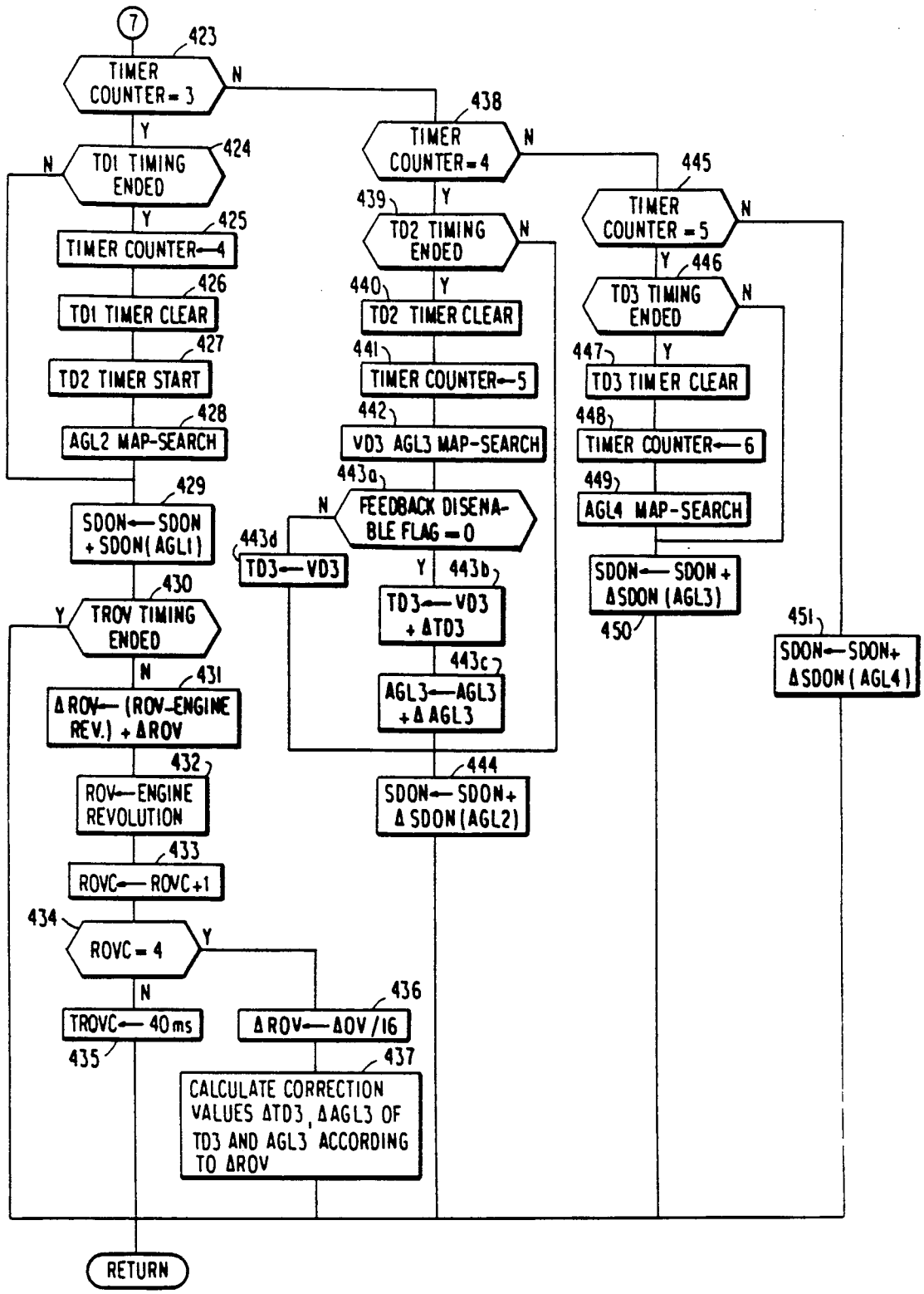

FIGS. 8a, 8b and 8c are flowcharts of the power off-upshift routine.

Like the power on-upshift routine, the processing of this routine is conducted with a value set in the timer counter for each time.

(1) timer counter=0.

As the timer counter is cleared when any shift process is ended, the timer counter is 0 during shift judgment.

After the timer counter is set "1", the timer Tup is set (Steps 377, 387). Next, the value VOFF is searched with a map search according to the operating state. When the feedback disenable flag is "0", then the sum of VOFF plus ΔTOFF is set to the timer TOFF, and the timer TOFF is started. When the feedback disenable flag is "1", then the value VOFF is set to the timer TOFF without any change (Step 379). The timer Tgd is then started, the duty ratio of the solenoid valve at the coupling side is set to 100%, while the memory OVC and OVL are set to "2" and the memories Rovc and ΔROV are cleared (Steps 380-385).

(2) timer counter=1.

As the timer counter is set to 1 when the timer counter=0, steps below Step 387 are then executed (Step 386).

First, it is necessary to see whether or not the timing in the timer Tup has ended. When it has ended, the timer TUP is cleared while the duty ratio of the solenoid valve at the coupling side is set to SD HOLD (Step 387-389).

The following step is to see whether or not the timing in the timer TOFF has ended. When it has ended, the timer TOFF is cleared, the duty ratio of the solenoid valve at the release side is set to 0%, the timer counter is set to "2", and the engine revolutions are put into Rov (Step 390-394).

(3) timer counter=2.

After the timing in the timer TOFF has ended, the timer counter then becomes to "2".

First, the program skips to Step 413 when the renewal of the calculation of the engine revolution has not been conducted. If the engine revolution rises, value 2 is put into OVL and the value OVC is subtracted by 1 (Steps 407, 408). When the value OVC is 0, the duty ratio of the solenoid valve at the release side is set to 100% and the release side is again coupled. Then the value of the timer TOV is read out from the map and the timer TOV is started while TOFF is read out from the map (Steps 409-412). When the engine revolution does not rise, but drops slowly, then the engine revolution is put into Rov (Step 405).

When the engine revolutions drop rapidly, OVL is checked to see whether or not it is still 2. If OVL is 2, then it is set to "1", and the engine revolution is put into Rov (Steps 401, 402). If OVL is not 2, then the value of ΔTOFF is searched from the map, and the value is taken as ΔTOFF after being added with a minus symbol (Step 403). Then the value OVL is subtracted by 1 (Step 404) while OVC is set to "2" (Step 406). Further, as the value OVL becomes a minus one through the subtraction operation at Step 404, the program then skips at Step 398 from Step 399 to Step 406.

The next step is to clear the timer Tov if the timing in the timer Tov has ended, and the duty ratio of the solenoid valve at the releasing side is set to 0% (Steps 413-415).

The following step is to see whether or not the timing in the timer Tgd has ended. When it has ended, then the timer Tgd is cleared, the timer Trov is set with a value of 40 ms and timer TD1 is set according to operation state started, the value of AGL1 is read out, the engine revolution is put into Rov and the timer counter is set to "3". (Steps 416-422).

According to this processing, after the release of the solenoid valve at the releasing side, if the engine revolution rises too quickly, the solenoid valve at the release side is coupled again only for Tov seconds while the time period TOFF for the next shift is lengthened. After the release of the solenoid valve at the releasing side, when two successive engine revolutions drop too rapidly, the time period TOFF for the next shift is shortened.

(4) Timer counter=3.

When the timing in the timer Tgd has ended, the timer counter is set to 3.

TD1 is then checked to see whether or not its operation has ended. When it has ended, the timer counter is set to "4", the timer TD1 is cleared, the timer TD2, which is set according to the operation state, is started and AGL2 is set (Steps 424-428). Besides, a value of ΔSDON (AGL1) based on value AGL1 is added to the duty ratio of the solenoid valve at the coupling side each time when a processing of timer counter=3 is performed (Step 429).

The next step is to see whether or not the operation of the timer TROV has ended (Step 430). If it has not ended, then the difference of Rov subtracted by the engine revolution is added to ΔRov (Step 431). Then the engine revolution is put into Rov and Rovc is increased by 1 (Steps 432, 433). Before Rovc becomes 4, a value of 40 ms is put into timer TROVC (Steps 434, 435). When Rovc becomes 4, ΔROV/16 is put into ΔRov, and ΔTD3 and ΔAGL3 are calculated from the new ΔRov (Steps 436, 437). As ΔRov is a value at the moment 160 ms after the timing of the timer Tgd has ended, the value is a quotient of the drop value of the engine revolution divided by 18 at the moment when the timing in the timer Tgd has ended, so it is the average drop value during a period of 10 ms, i.e., the average drop rate.

(5) timer counter=4.

When the timing in the timer TD1 has ended, the timer counter becomes 4. Before the timing in the timer TD2 has ended, a value of ΔSDON (AGL2) is added to the duty ratio of the solenoid valve at the coupling side each time (Steps 439, 444).

When the timing in the timer TD2 has ended, the timer TD2 is then cleared and the timer counter is set to 5 (Steps 440, 441). The next step is to search from the map the value VD3 and AGL3 according to the operation condition. After that, when the feedback disenable flag is "0", a value, which is the sum of VD3 and ΔTD3, is set into the timer TD3, and the operation of the timer is started. Further, ΔAGL3 is added to AGL3 for correction. When the feedback disenable flag is "1" VD3 is put into the timer TD3 without any change (Steps 442, 443).

(6) timer counter=5.

When the operation of the timer TD2 has ended, the timer counter is set to 5. Here the processing is similar to that of the timer counter=6 in the power on-upshift routine. Before the operation of the timer TD3 has ended, a value of ΔSDON (AGL3) is added to the duty ratio of the solenoid valve at the coupling side each time.

(7) timer counter=6.

When the timing in the timer TD3 has ended, the timer counter becomes 6. Here the processing is similar to that of the timer counter=7 in the power on-upshift routine, and each time a value of ΔSDON (AGL4) is added to the duty ratio of the solenoid valve at the coupling side.

(8) end of power off-upshift.

During the aforementioned processing, after the engine revolution becomes the engine revolution REND, which may be reached at the end of upshift, the shift flag is cleared, the timer TD3 is cleared and the duty ratio of the solenoid valve at the coupling side is set to 100% (Steps 386-370). Then, the timer counter is cleared. OVC and OVL are replaced by 2, a value "0" is put into ΔROV and the power off-upshift control is ended.

Figure 11:
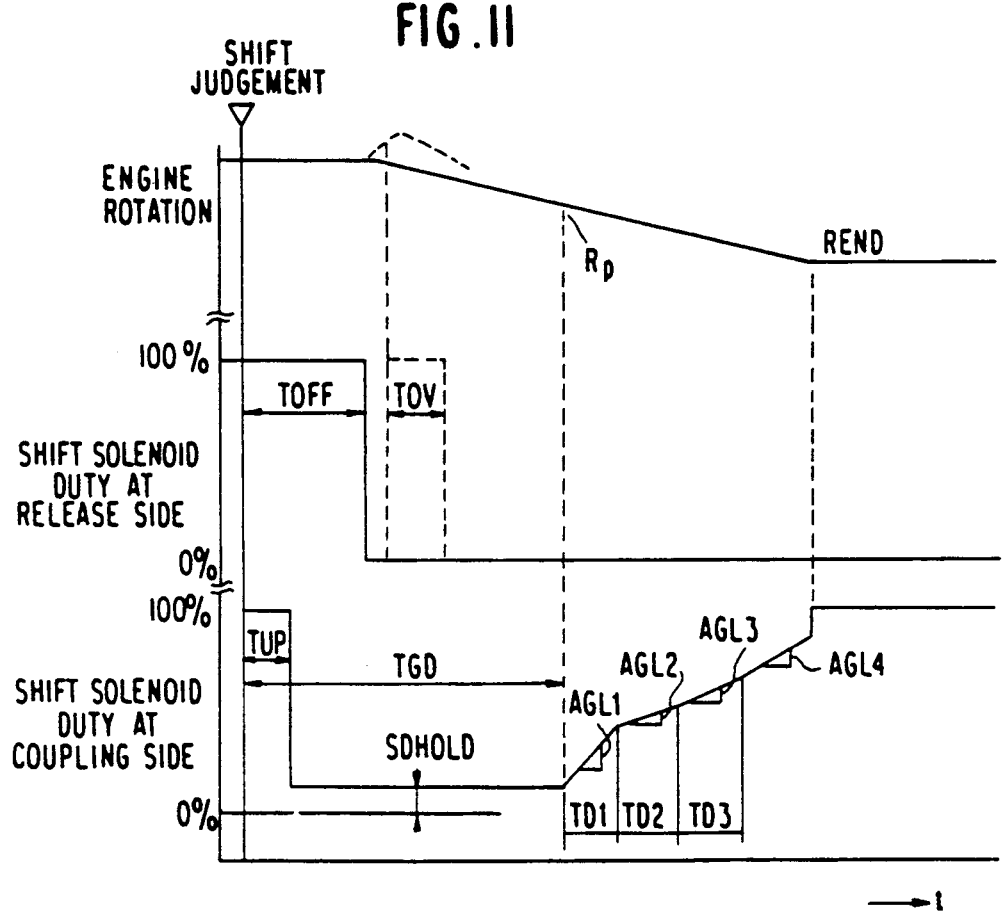

The above-mentioned processing flowchart is shown in FIG. 11 with a time chart. The duty ratio of the solenoid valve at the release side is set to 0% after a period of TOFF seconds. But, when the engine revolution rises too quickly after the period of TOFF seconds, the duty ratio of the solenoid valve at the coupling side is fixed to 100% during a period of TUP seconds after the shift judgment, and becomes thereafter SDHOLD % Tgd seconds after the beginning of the shift judgment. The curve in FIG. 11 then rises at a slope of AGL1 during the following TD1 second period, rises at a slope of AGL2 during the following TD2 second period and continues to rise at a slope of AGL3 during the following TD3 second period. It continues to rise thereafter at a slope of AGL4. The duty ratio is fixed to 100% when the engine revolution reaches REND, and the control process is ended.

Downshift Routine

Figure 9A:
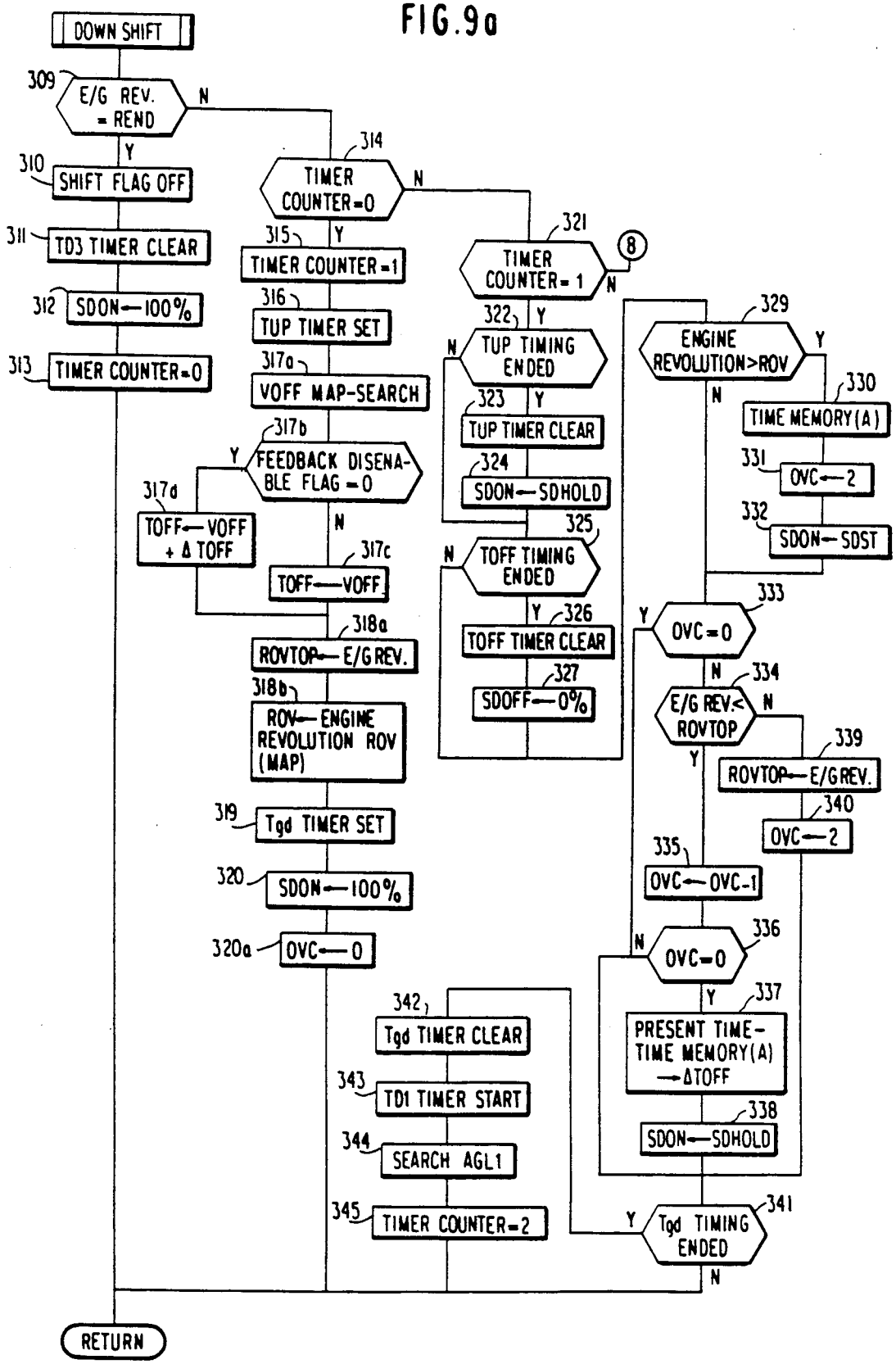
FIGS. 9a and 9b are flowcharts of the downshift subroutine of the output control routine shown in FIG. 6.
Figure 9B:
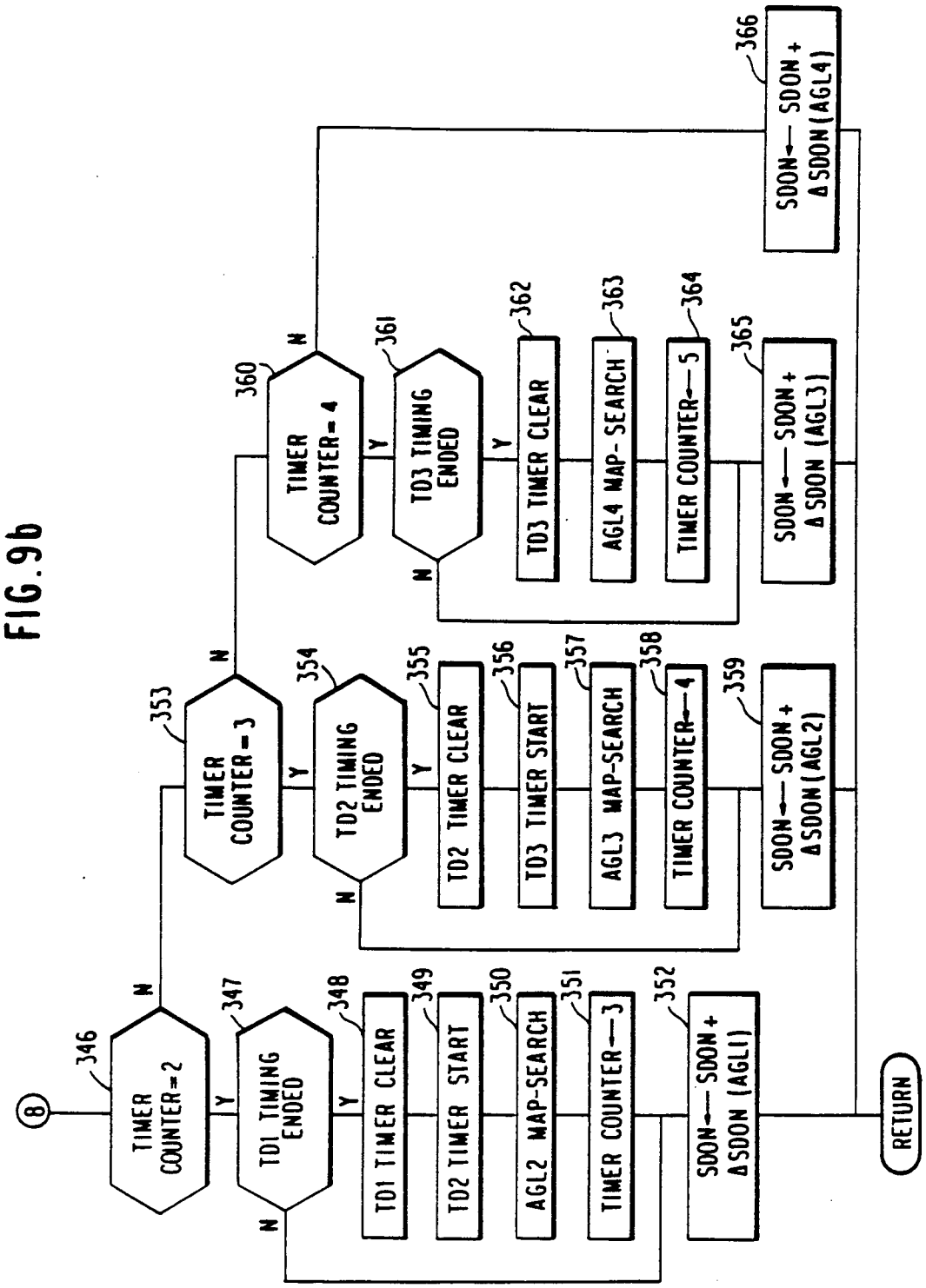

FIGS. 9a and 9b are flowcharts of the downshift routine. Like the power on-upshift routine, the processing of this routine is also conducted with each value set in the timer counter.

(1) timer counter=0.

The timer counter is cleared when any shift process has ended, so that the timer counter is 0 when in a shift judgment.

After the value of the timer counter is changed to 1, the timer TUP is set (Steps 315, 316). Next, the value VOFF is searched from the map according to the vehicle operation state. When the feedback disenable flag is "0", the sum of ΔVOFF and ΔTOFF is set into the timer TOFF, and the timer TOFF is started. When the feedback disenable flag is "1", the value VOFF is set into the timer TOFF without any change (Sep 317).

Next, ROVTOP is replaced with the engine revolution, Rov is read out from the memory, and Rov is renewed with the sum of Rov and the engine revolution (Step 318). Then, the timer Tgd is started, the duty ratio of the solenoid valve at the coupling side is set to 100%, and OVC is cleared (Steps 319, 320).

(2) timer counter=1.

As the timer counter is set to "1" when the timer counter is 0, steps below Step 322 are executed (Step 321).

The first step is to see whether or not the timing of the timer TUP has ended. When it has ended, the timer TUP is cleared and the duty ratio of the solenoid valve at the coupling side is set to SDHOLD (Steps 322-324).

The next step is to see whether or not the timing in the timer TOFF has ended, and when it has ended, the timer TOFF is cleared and the duty ratio of the solenoid valve at the releasing side is set 0% (Steps 325-327).

The following step is to check whether or not the engine revolution is larger than Rov. If it is larger than Rov, then the present time is stored into the time memory A, OVC is set to "2", and the duty ratio of the solenoid valve at the coupling side is set to SDST (Steps 329-332). The next step is to check whether or not OVC is 0. When OVC is not 0, the engine revolution is compared with the value ROVTOP. When the engine revolution is larger than ROVTOP, the engine revolution is put into ROVTOP and OVC is set to "2" (Steps 334, 339, 340). When the engine revolution is smaller than ROVTOP, 1 is subtracted from the value OVC (Step 335). When the value of OVC is 0, then the difference of the present time subtracted by the time stored in the memory A is put into ΔTOFF, and the duty ratio of the solenoid valve at the coupling side is set to SDHOLD (Steps 336-338).

When the timing of the timer Tgd has ended, the timer Tgd is cleared, the timer TD1 is started, and the timer counter is set to "2" after searching the value AGL1 (Steps 341-345).

Memory OVC is then set to "0" at beginning of the shifting, and becomes 2 when the engine revolution reaches a value which is larger than the set value at the beginning of shifting. This value of the memory OVC is always 2 during the engine upshift process and 1 is subtracted for each time the engine revolution reaches its peak value and does not continue to rise. Then the value becomes 0 when the engine revolution does not rise for two successive times. From the moment when the engine revolution rises to the value larger than the set value at the beginning of upshift, to the moment when the engine revolution does not rise for two successive times, the duty ratio of the solenoid valve at the coupling side is changed to SDST %. Furthermore, the time the period from the moment when the engine revolution rises to the value larger than the set value at the beginning of upshift, to the moment when the engine revolution does not rise for two successive times, is then put into ΔTOFF. As this ΔTOFF is added to the time value needed for releasing the solenoid valve at the releasing side during the next shift operation, the engine revolution will not rise rapidly during the next shift operation.

(3) timer counter=2.

The timer counter becomes 2 when the timing of timer Tgd has ended.

Step 347 checks whether or not the timing in the timer TD1 has ended. When it has ended, the timer TD1 is cleared, the timer TD2 is set, AGL2 is set and "3" is put into the timer counter (Steps 347-351). A value ΔSDON (AGL1), based on value AGL1, is added to the duty ratio of the solenoid valve at the coupling side each time a processing of the timer counter 2 is conducted (Step 352).

(4) timer counter=3.

The timer counter becomes 3 when the timing of the timer TD1 has ended. Each time a value of ΔSDON (AGL2) has ended. Each time a value of SDON (AGL2) is added to the duty ratio of the solenoid valve of the coupling side before the timing of the timer TD2 is ended (Step 359).

When the timing in the timer TD2 has ended, the timer TD2 is cleared, and the timer TD3 is started. TD3 is set according to vehicle operation state. Then, the value AGL3 is searched from the map according to the vehicle operation state, and the timer counter is set to "4" (Steps 355-358).

(5) timer counter=4.

The timer counter becomes 4 when the timing in the timer TD2 has ended. The processing here is similar to that of the timer counter=6 in the power on-upshift routine, and each time a value of ΔSDON (AGL3) is added to the duty ratio of the solenoid valve at the coupling side before the timing of the timer TD3 has ended.

(6) timer counter=5.

The timer counter becomes 5 when the timing in the timer TD3 has ended. The processing here is similar to that of the timer counter=7 in the power on-upshift routine, and each time a value of ΔSDON (AGL4) is added to the duty ratio of the solenoid valve at the coupling side.

(7) end of downshift.

During the aforementioned processing, when the engine revolution becomes the engine revolution REND which may be reached at the end of shift, the shift flag is cleared, the timer TD3 is cleared and the duty ratio of the solenoid valve at coupling side is set to 100% (Steps 310-312). Then the timer counter is cleared, and the control of the downshift is ended.

Figure 12:
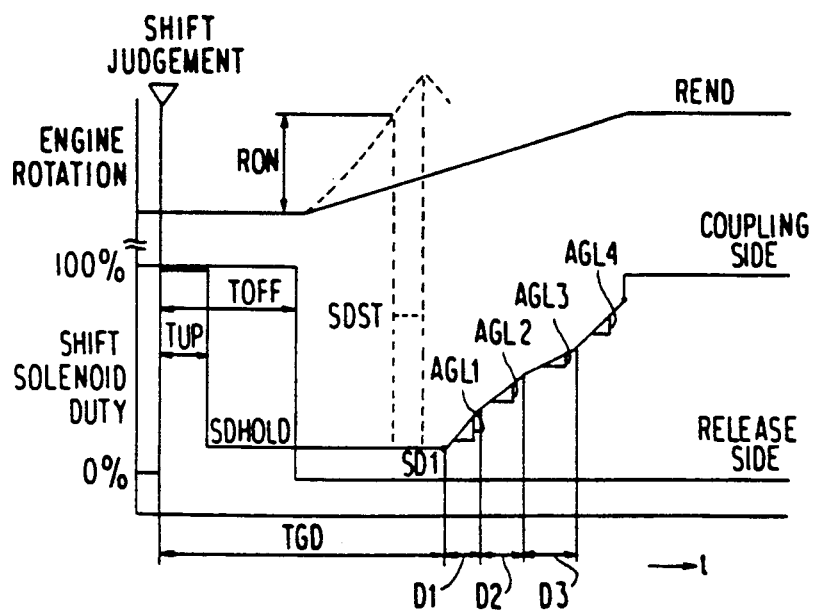
FIGS. 10, 11 and 12 are time charts of the processes of power on-upshift, power off-upshift and downshift in the embodiment of the present invention.

The aforementioned downshift processing flowcharts is shown in FIG. 12 with a time chart. The duty ratio of the solenoid valve at the releasing side is set to 0% after a period of TOFF seconds. The duty ratio of the solenoid valve at the coupling side is fixed to 100% during a period of TUP SDHOLD % Tgd seconds after the beginning of the shift judgment. But, when the engine revolution reaches a value which is larger than the set value, the duty ratio of the solenoid value at the coupling side becomes SDST % before the engine revolution reaches its peak value. The curve in FIG. 12 then rises at a slope of AGL1 during a period of TD1 seconds, rises at a slope of AGL2 during the following TD2 second period and rises at a slope of AGL3 during the following TD3 second period. It continues to rise at a slope of AGL4 thereafter. When the engine revolution reaches REND, the duty ratio is fixed to 100% and the whole control is ended.

As described in the foregoing, the invention is an electronically controlled automatic transmission which includes an automatic gear shift having a clutch and a brake which operate according to the exerted hydraulic pressure, and which changes the gear ratio according to the state of coupling or decoupling of the clutch and brake; a hydraulic pressure switching means (hydraulic circuit) controls the pressure exerted on the clutch and the brake; time setting means (Steps 460a, 509, 534, 379a, 442, 317a) or ratio setting means (Steps 494, 534, 442) set a time or ratio for the coupling or releasing of the clutch or brake during shifting; a vehicle information detecting means (23) detects the vehicle information during shifting time correction means (Steps 494, 508, 527, 403, 412, 437, 337) or ratio correction means (Steps 508, 527, 437) for correcting the set time or set ratio of coupling or releasing according to the vehicle information; and an electric control means (CPU) for driving the hydraulic pressure switching means and changing the state of coupling or decoupling of the clutch and the brake according to the set time or set ratio. The electronically controlled automatic transmission comprises a temperature detecting means (36) for detecting the temperature of the working fluid of the hydraulic pressure switching means and a feedback stop means (Steps 239–241, 460b, 501, 535a, 379b, 443a, 317b) for stopping the correction of the set time or the set ratio conducted with the time or ratio correction means when the detected temperature of the temperature detecting means is indicated as a low temperature.

Therefore, when the temperature drops and therefore the viscosity of the working fluid becomes higher, the feedback control is stopped and the time or ratio is determined with predetermined average constants.

When the viscosity of the working fluid becomes high, the time period from the indication of the electronic control means to the real coupling or releasing movement of the clutch or brake becomes long. For this reason, even though feedback control is conducted, there is still a situation where the shock cannot be reduced at al. For instance, when the state of the engine duty is detected and both the coupling state of the clutch or brake at the coupling side and that of the clutch or brake at the release side are well controlled in order to reduce shock, as the time period from the moment of indication of the coupling or the releasing state to the moment of the real coupling or releasing state is very long, e.g., because the working fluid viscosity is high due to a low temperature thereof), and therefore control of the coupling state at the coupling and release sides is inaccurate, resulting in even more shock.

By the present invention, as the feedback operation is stopped, although a shock will occur at low temperatures just as in the case of the apparatus having no feedback control, the increase of shock caused by the reverse effect of the feedback control can be avoided.

What is claimed is:

1. An electronically controlled automatic transmission for a vehicle comprising:
   automatic gear shift means, having a clutch and a brake driven by hydraulic pressure, for changing the gear ratio in accordance with the coupling-/decoupling of said clutch and brake;
   hydraulic switching means for controlling the hydraulic pressure exerted on said clutch and brake;
   timing means for setting during a shifting period a coupling/decoupling time of said clutch and brake;
   vehicle information detecting means for detecting, during the shifting period, vehicle information;
   time correction means for correcting the time set by said timing means in accordance with vehicle information from said vehicle information detecting means;
   electronic control means for driving said hydraulic pressure switching means in accordance with said corrected set time, and for changing the state of coupling and decoupling of said clutch and brake; temperature detecting means for detecting the temperature of a working fluid of said hydraulic pressure switching means; and feedback stop means for stopping, when said temperature detecting means detects that the temperature of the working fluid is below a predetermined temperature, the correction of the set time of coupling/releasing by said time correction means.

2. The electronically controlled automatic transmission as claimed in claim 1, wherein said time correction means provides a corrected time which is the time from the moment of shifting to the moment when one of the clutch and brake is released.

3. The electronically controlled automatic transmission as claimed in claim 1, wherein said electronic control means is operable for indicating the coupling of one of the clutch and the brake at a coupling side thereof, and wherein said correction means provides a correction time which is the time used for coupling when one of the clutch and brake is coupled.

4. An electronically controlled automatic transmission for a vehicle comprising:
   automatic gear shift means, having a clutch and a brake driven by hydraulic pressure, for changing the gear ratio in accordance with the coupling and decoupling of said clutch and brake;
   hydraulic switching means for controlling the hydraulic pressure exerted on said clutch and brake;
   rate setting means for setting a rate of coupling-/releasing of said clutch and brake during a shifting period;
   vehicle information detecting means for detecting vehicle information during the shifting period;
   rate correction means for correcting the rate of coupling/releasing by said rate setting means in accordance with vehicle information from said vehicle information detecting means; and
   electronic control means for driving said hydraulic pressure switching means in accordance with said correction set rate, and for changing the state of coupling and decoupling of said clutch and brake; a temperature detecting means for detecting the temperature of a working fluid of said hydraulic pressure switching means; and feedback stop means for stopping, when said temperature detecting means detects that the temperature of the working fluid is below a predetermined temperature, the correction of the rate set by said rate correction means.

5. The electronically controlled automatic transmission as claimed in claim 4, wherein said electronic control means is operable for indicating the coupling of one of said clutch and brake at a coupling side thereof, and said corrected set rate is the rate used for determining the speed for coupling when one of the clutch and said brake is coupled.

* * * * *